United States Patent
Makar et al.

(10) Patent No.: US 11,039,149 B2
(45) Date of Patent: Jun. 15, 2021

(54) DYNAMIC VIDEO INSERTION BASED ON FEEDBACK INFORMATION

(71) Applicant: QUALCOMM Incorporated, San Diego, CA (US)

(72) Inventors: Mina Ayman Saleh Yanni Makar, San Diego, CA (US); Ajit Venkat Rao, Bangalore (IN); Sandeep Kanakapura Lakshmikantha, Ramanagar District (IN); Qi Xue, San Diego, CA (US); Bibhu Mohanty, San Diego, CA (US); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/529,710

(22) Filed: Aug. 1, 2019

(65) Prior Publication Data

US 2021/0037250 A1 Feb. 4, 2021

(51) Int. Cl.
*H04N 19/166* (2014.01)
*H04N 19/137* (2014.01)
(Continued)

(52) U.S. Cl.
CPC ......... *H04N 19/166* (2014.11); *H04N 19/137* (2014.11); *H04N 19/174* (2014.11); *H04N 19/895* (2014.11)

(58) Field of Classification Search
CPC .. H04N 19/166; H04N 19/137; H04N 19/174; H04N 19/895
See application file for complete search history.

(56) References Cited

U.S. PATENT DOCUMENTS

| 7,706,384 B2 | 4/2010 | Van Beek |
| 8,428,125 B2 | 4/2013 | Oguz et al. |

(Continued)

FOREIGN PATENT DOCUMENTS

| EP | 1120966 A2 | 8/2001 |
| WO | 2000041395 A1 | 7/2000 |
| WO | 2017007606 A1 | 1/2017 |

OTHER PUBLICATIONS

Ali, I., et al., "Content Dependent Intra-Refresh Placement for Video Streaming", 2011 3rd Computer Science and Electronic Engineering Conference (CEEC), IEEE, Jul. 2011.
(Continued)

*Primary Examiner* — Jeremiah C Hallenbeck-Huber
(74) *Attorney, Agent, or Firm* — Polsinelli LLP

(57) ABSTRACT

Techniques are provided for adaptively controlling an encoding device to allow dynamic insertion intra-coded video content based on feedback information. For example, at least a portion of a video slice of a video frame in a video bitstream can be determined to be missing or corrupted. Feedback information indicating at least the portion of the video slice is missing or corrupted can be sent to an encoding device. An updated video bitstream can be received from the encoding device in response to the feedback information. The updated video bitstream can include at least one intra-coded video slice having a size that is larger than the missing or corrupted video slice. The size of the at least one intra-coded video slice can be determined to cover the missing or corrupted slice and propagated error in the video frame caused by the missing or corrupted slice.

60 Claims, 20 Drawing Sheets

(51) Int. Cl.
  *H04N 19/174* (2014.01)
  *H04N 19/895* (2014.01)

(56) References Cited

U.S. PATENT DOCUMENTS

| | | | |
|---|---|---|---|
| 8,861,585 | B2 | 10/2014 | Subramanian et al. |
| 9,807,388 | B2 | 10/2017 | Zhang |
| 10,110,930 | B2 | 10/2018 | Yang et al. |
| 10,193,955 | B2 | 1/2019 | Leroux et al. |
| 2006/0126728 | A1 | 6/2006 | Yu et al. |
| 2007/0130596 | A1* | 6/2007 | Wirick ............ H04N 21/26275 725/90 |
| 2008/0095246 | A1* | 4/2008 | Luo ............ H04N 19/61 375/240.27 |
| 2008/0176517 | A1* | 7/2008 | Lee ............ H04N 21/6131 455/63.1 |
| 2009/0141800 | A1* | 6/2009 | Larson ............ H04N 21/2365 375/240.12 |
| 2009/0213938 | A1* | 8/2009 | Lee ............ H04N 19/70 375/240.24 |
| 2009/0252227 | A1* | 10/2009 | Nepomucenoleung ............ H04N 19/89 375/240.13 |
| 2009/0295905 | A1* | 12/2009 | Civanlar ............ H04L 12/4604 348/14.09 |
| 2016/0056927 | A1* | 2/2016 | Liu ............ H04L 1/1887 370/216 |
| 2016/0219088 | A1* | 7/2016 | Ma ............ H04L 47/32 |
| 2017/0085871 | A1* | 3/2017 | Wang ............ H04N 19/503 |
| 2017/0280167 | A1* | 9/2017 | van der Laan ...... H04N 19/105 |
| 2017/0318308 | A1 | 11/2017 | Lu et al. |
| 2018/0091791 | A1* | 3/2018 | Jiang ............ B24B 23/026 |
| 2018/0220151 | A1* | 8/2018 | Siddaramanna ..... H04N 19/107 |
| 2019/0037244 | A1 | 1/2019 | Melkote Krishnaprasad et al. |

OTHER PUBLICATIONS

Stockhammer, T., "System and Cross-Layer Design for Mobile Video Transmission", Technische Universitat Munchen, Sep. 2008.

Ott, J., et al., "Extended RTP Profile for Real-time Transport Control Protocol (RTCP)-Based Feedback (RTP/AVPF)" Helsinki University of Technology, The Internet Society (2006), Jul. 2006.

Wenger, S., et al., Codec Control Messages in the RTP Audio-Visual Profile with Feedback (AVPF), Nokia, Feb. 2008.

Makar, M., et al., "Signaling Offset from 5G system to Multi-Access Edge Servers (MEC) and User Applications".

Chiew T-K, et al., "Error-resilient Low-delay H.264/802.11 Transmission Via Cross-layer Coding with Feedback Channel", Visual Communications and Image Processing; Dec. 7, 2005-Jul. 15, 2005; Beijing, Jul. 12, 2005 (Jul. 12, 2005), XP030081032, pp. 1868-1879, abstract Sections 2.1, 3.2 and 4; figures 5,6.

Partial International Search Report—PCT/US2020/043232—ISA/EPO—dated Oct. 12, 2020.

Zia W, et al., "Interactive Error Control for Mobile Video Telephony," Proceedings of the 2007 IEEE International Conference on Communications (ICC 2007), Jun. 24-28, 2007, Glasgow, UK, IEEE, Piscataway, NJ, USA, Jun. 1, 2007 (Jun. 1, 2007), pp. 1797-1802, XP031125933, ISBN: 978-1-4244-0353-0 abstract Section III.

International Search Report and Written Opinion—PCT/US2020/043232—ISA/EPO—dated Jan. 19, 2021.

Moiron S., et al., "Enhanced Slicing for Robust Video Transmission" EUROCON—International Conference on Computer as a Tool (EUROCON), 2011 IEEE, Apr. 27-29, 2011, Lisbon Portugal, IEEE, Piscataway, NJ, Apr. 27, 2011 (Apr. 27, 2011), 4 Pages, XP032151614, DOI: 10.1109/EUROCON.2011.5929344, ISBN: 978-1-4244-7486-8, Abstract Sections I., II, and III., Especially Sub-Section III.A, Figure 2.

Thiesse J-M (VITEC)., et al., "Improved Cyclic Intra Refresh" 11. JVET Meeting, Jul. 11. 2018-Jul. 18, 2018, Ljubljana, (The Joint Video Explorationteam of ISO/IEC JTC1/SC29/WG11 and ITU-TSG.16), No. JVET-K0212, Jul. 15, 2018 (Jul. 15, 2018), XP030199839, 7 Pages, Retrieved from the Internet: URL:http://phenix.int-evry.fr/jvet/doc_end_user/documents/11_Ljubljana/wg11/JVET-K0212-v3.zip JVET-K0212 v3.docx [retrieved on Jul. 15, 2018] Section 2 with Sub-Sections.

Video: "MPEG-4 Video Verification Model Version 15.0", 50. MPEG Meeting, Dec. 6, 1999-Dec. 12, 1999, Maui, HI, (Motion Picture Expert Group or ISO/IEC JTC1/SC29NVG11), No. N3093, n3093, Dec. 11, 1999 (Dec. 11, 1999), XP030011235, pp. 1-391, Retrieved from the Internet: URL:http://phenix.int-evry.fr/mpeg/doc_end_user/documents/50_Maui/wg11/w3093.zip w3093.doc [retrieved on Aug. 27, 2010] Section 3.6 (with sub-sections) and Appendix H.

\* cited by examiner

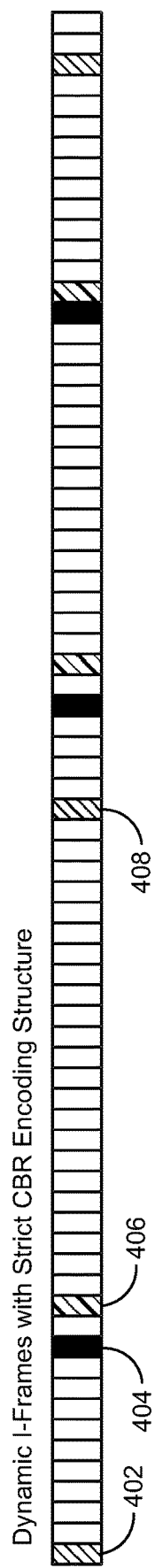
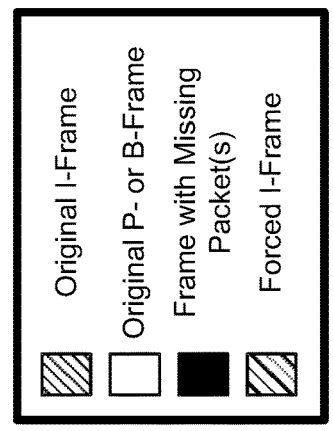
FIG. 4

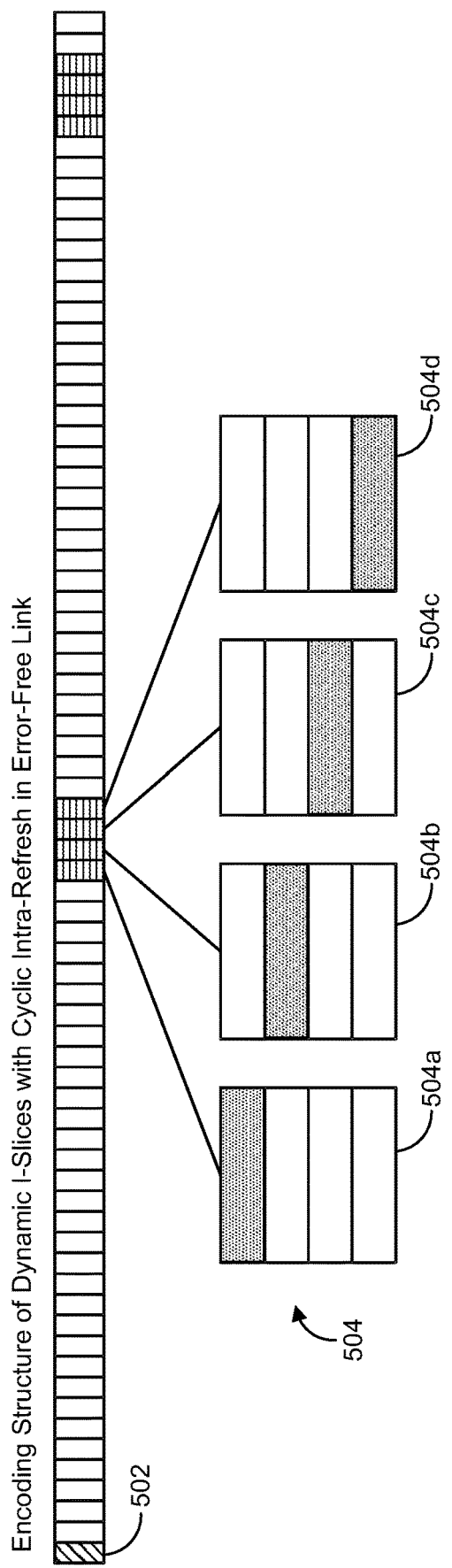
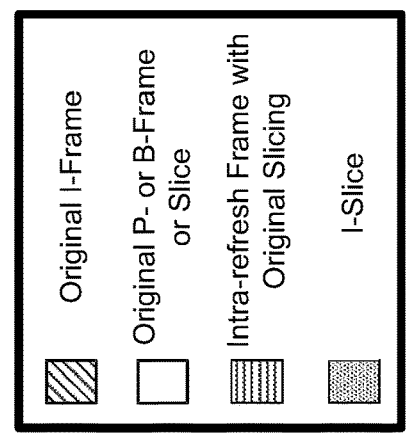
FIG. 5

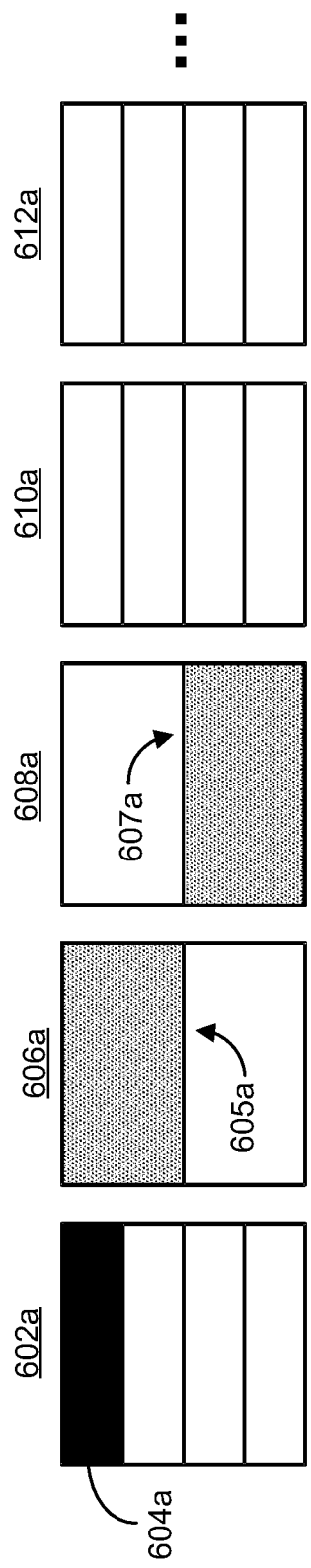
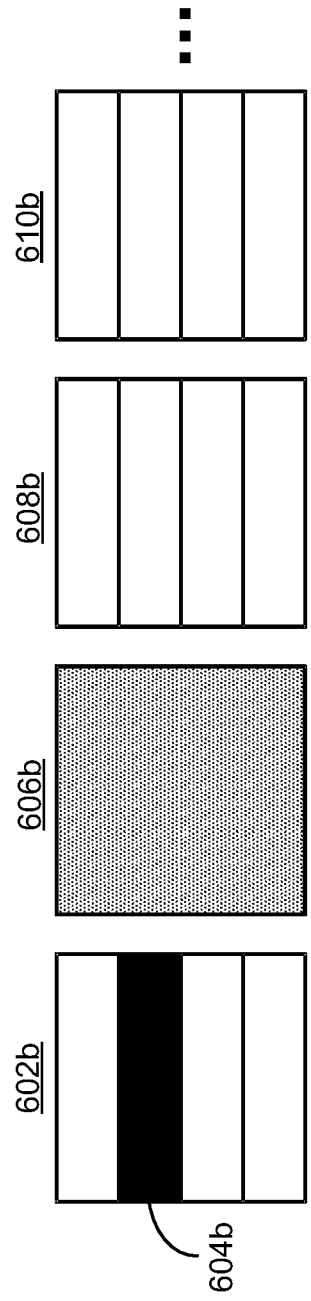
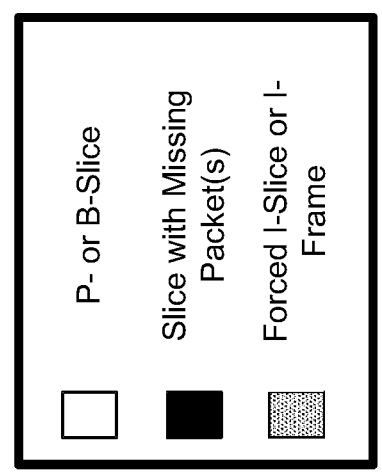
FIG. 6A
FIG. 6B

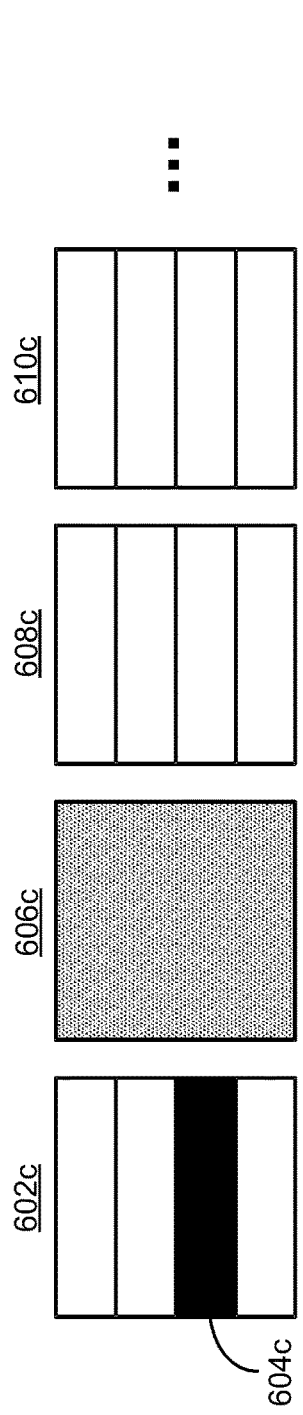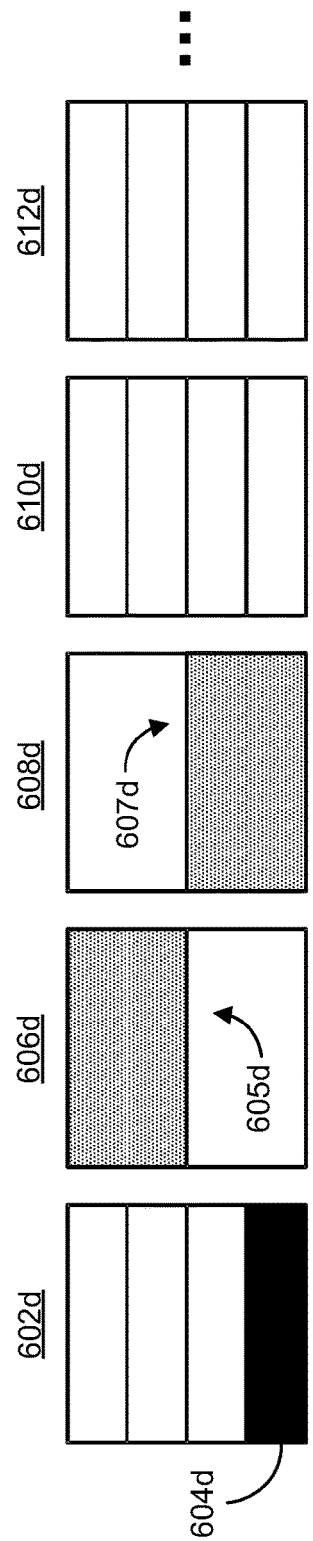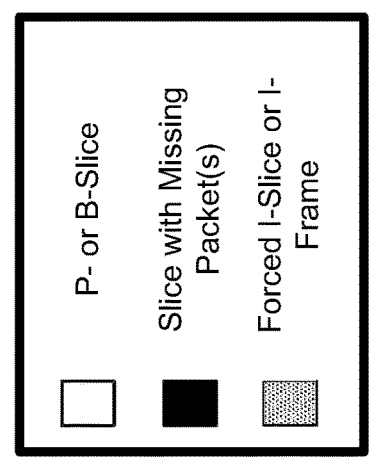
FIG. 6C
FIG. 6D

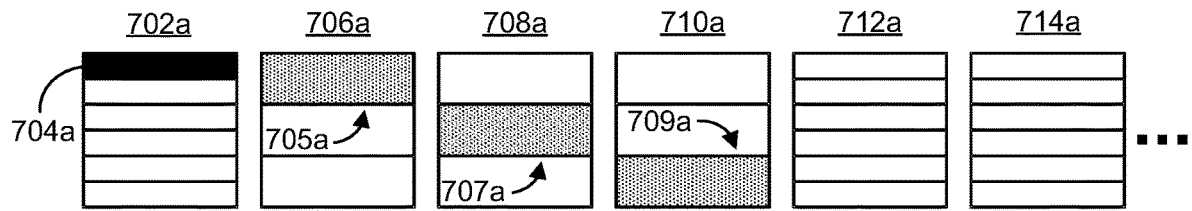
FIG. 7A
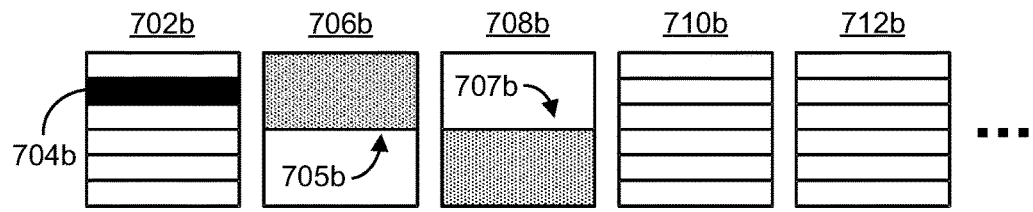
FIG. 7B
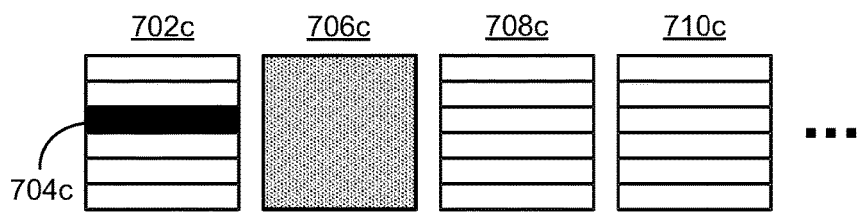
FIG. 7C
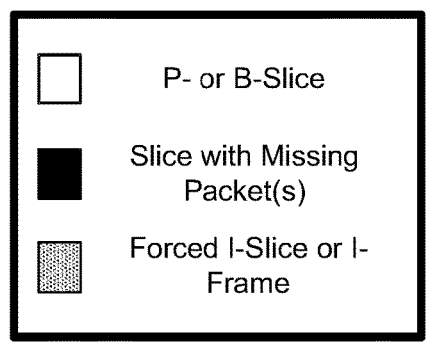

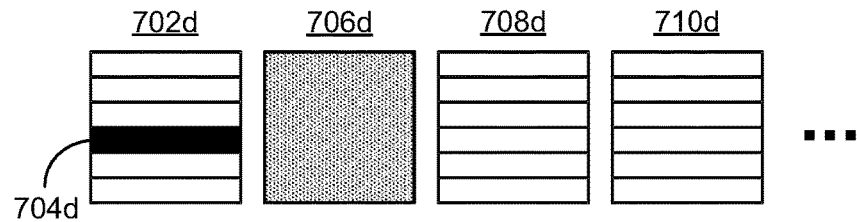
FIG. 7D
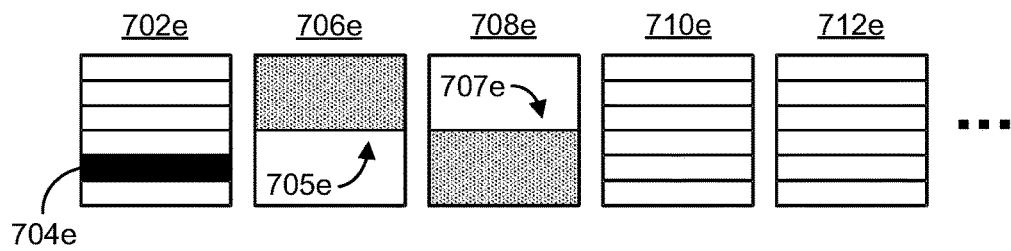
FIG. 7E
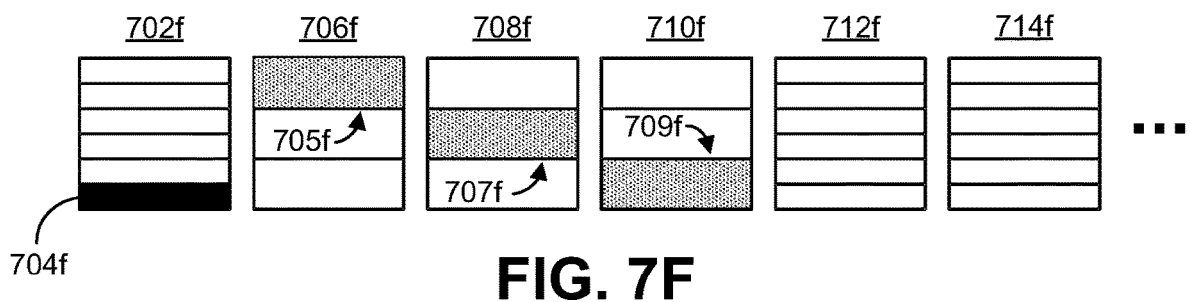
FIG. 7F
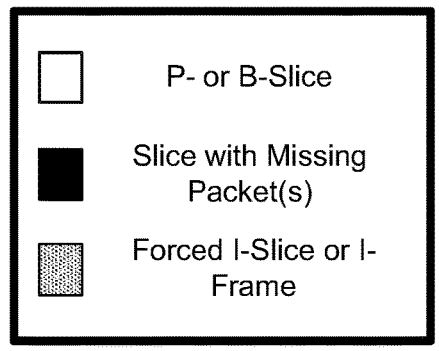

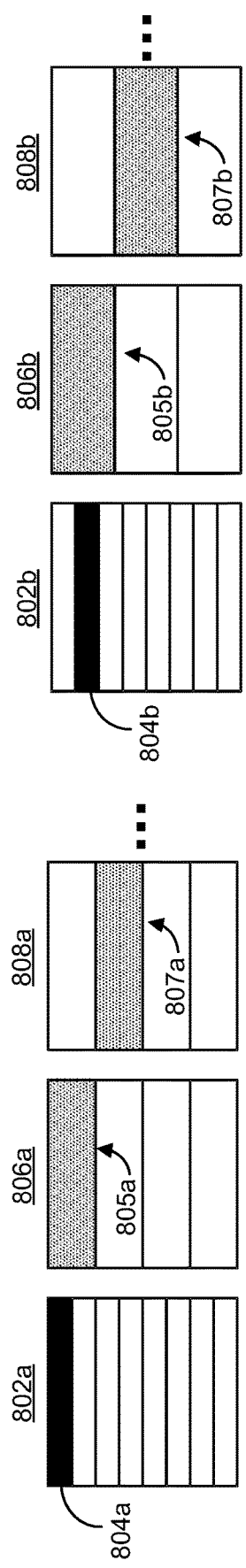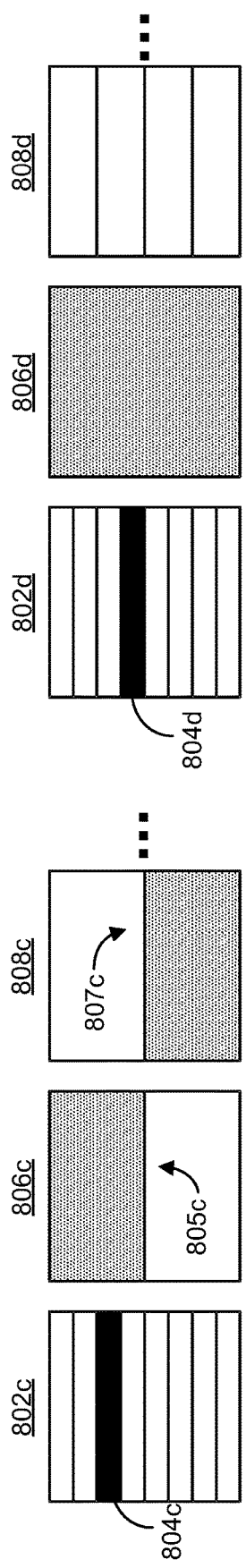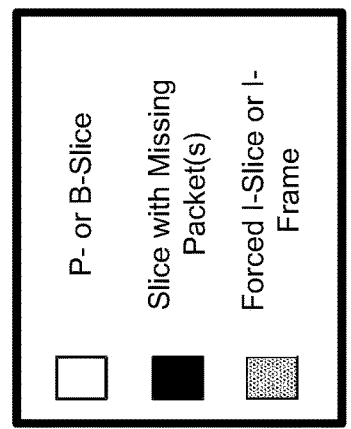
FIG. 8A
FIG. 8B
FIG. 8C
FIG. 8D

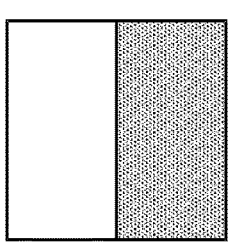 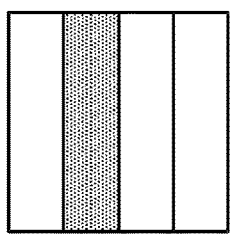
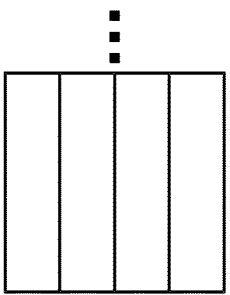 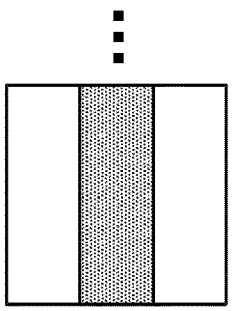 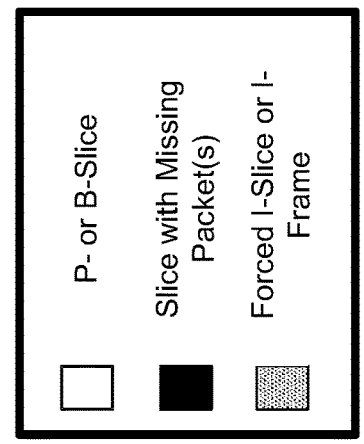
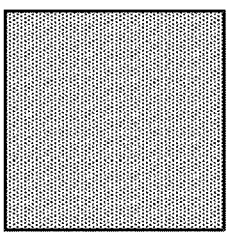
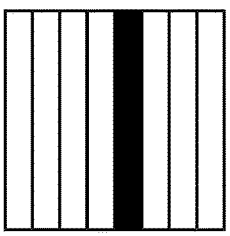 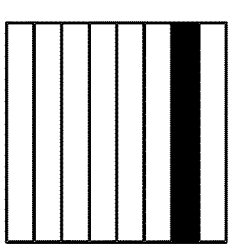
FIG. 8E  FIG. 8F  FIG. 8G  FIG. 8H

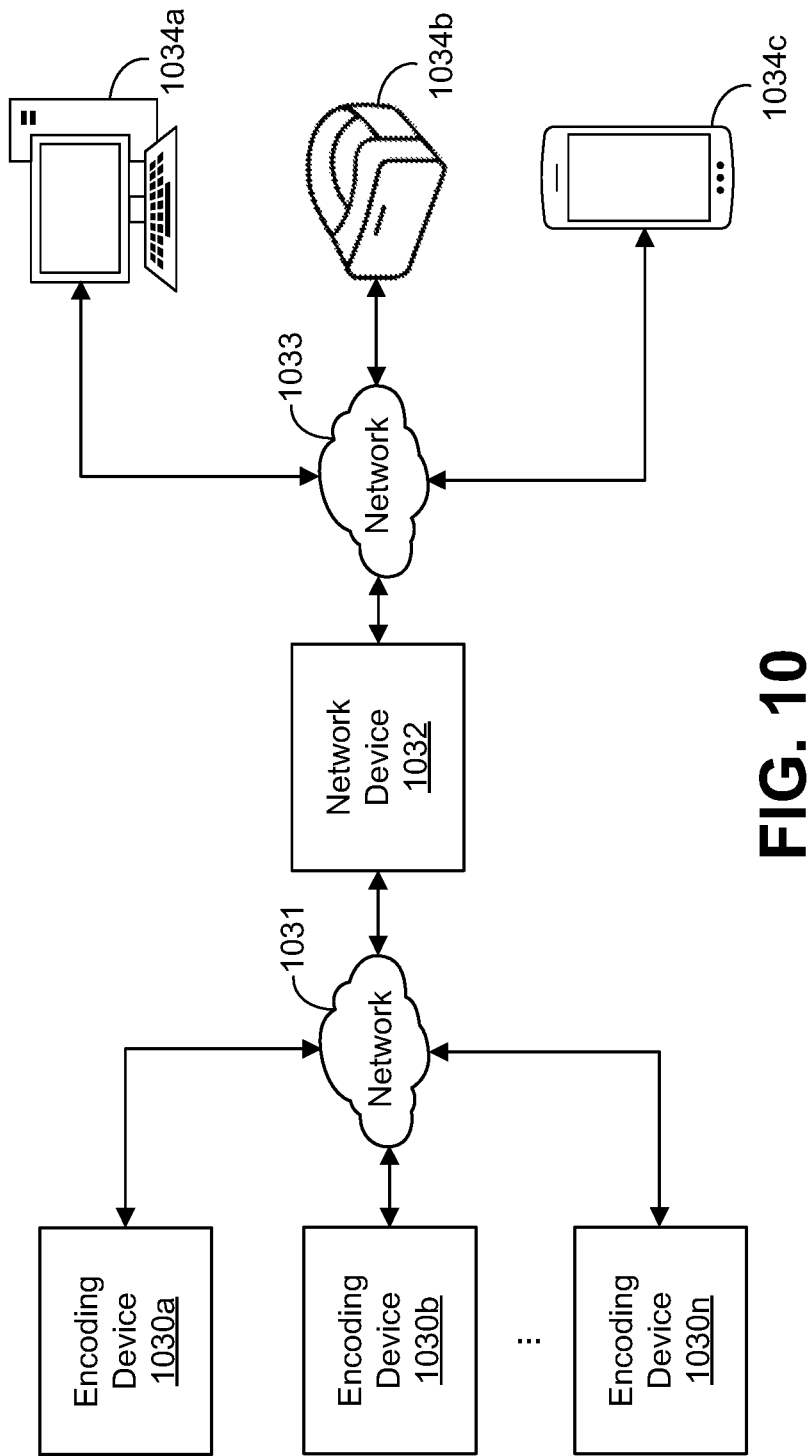

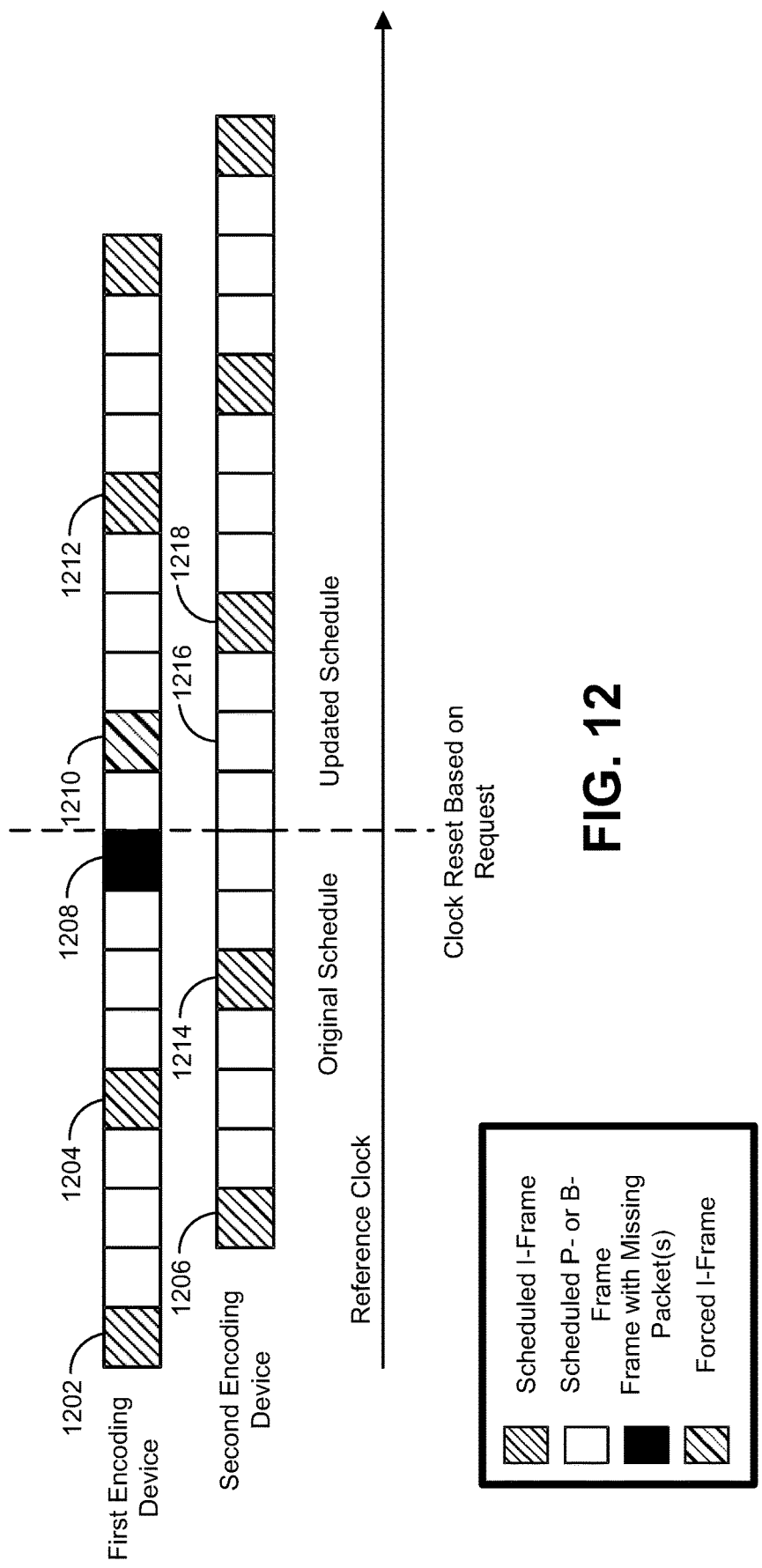

1300

DETERMINE, BY A COMPUTING DEVICE, AT LEAST A PORTION OF A VIDEO SLICE OF A VIDEO FRAME IN A VIDEO BITSTREAM IS MISSING OR CORRUPTED
1302

SEND FEEDBACK INFORMATION TO AN ENCODING DEVICE, THE FEEDBACK INFORMATION INDICATING AT LEAST THE PORTION OF THE VIDEO SLICE IS MISSING OR CORRUPTED
1304

RECEIVE AN UPDATED VIDEO BITSTREAM FROM THE ENCODING DEVICE IN RESPONSE TO THE FEEDBACK INFORMATION, THE UPDATED VIDEO BITSTREAM INCLUDING AT LEAST ONE INTRA-CODED VIDEO SLICE HAVING A SIZE THAT IS LARGER THAN THE MISSING OR CORRUPTED VIDEO SLICE, WHEREIN THE SIZE OF THE AT LEAST ONE INTRA-CODED VIDEO SLICE IS DETERMINED TO REPLACE THE MISSING OR CORRUPTED SLICE AND ANY PROPAGATED ERROR IN THE VIDEO FRAME CAUSED BY THE MISSING OR CORRUPTED SLICE
1306

RECEIVE, AT AN ENCODING DEVICE, FEEDBACK INFORMATION FROM A COMPUTING DEVICE, THE FEEDBACK INFORMATION INDICATING AT LEAST A PORTION OF A VIDEO SLICE OF A VIDEO FRAME IN A VIDEO BITSTREAM IS MISSING OR CORRUPTED
1402

GENERATING AN UPDATED VIDEO BITSTREAM IN RESPONSE TO THE FEEDBACK INFORMATION, THE UPDATED VIDEO BITSTREAM INCLUDING AT LEAST ONE INTRA-CODED VIDEO SLICE HAVING A SIZE THAT IS LARGER THAN THE MISSING OR CORRUPTED VIDEO SLICE, WHEREIN THE SIZE OF THE AT LEAST ONE INTRA-CODED VIDEO SLICE IS DETERMINED TO REPLACE THE MISSING OR CORRUPTED SLICE AND ANY PROPAGATED ERROR IN THE VIDEO FRAME CAUSED BY THE MISSING OR CORRUPTED SLICE
1404

GENERATE, BY AN ENCODING DEVICE, A VIDEO BITSTREAM, WHEREIN INTRA-CODED VIDEO DATA IS INSERTED INTO THE VIDEO BITSTREAM ACCORDING TO A REFERENCE CLOCK SHARED WITH AT LEAST ONE OTHER ENCODING DEVICE, THE REFERENCE CLOCK DEFINING A SCHEDULE FOR STAGGERING INTRA-CODED VIDEO FROM THE ENCODING DEVICE AND THE AT LEAST ONE OTHER ENCODING DEVICE
1502

OBTAIN, BY THE ENCODING DEVICE, FEEDBACK INFORMATION INDICATING AT LEAST A PORTION OF A VIDEO SLICE OF THE VIDEO BITSTREAM IS MISSING OR CORRUPTED
1504

SEND, IN RESPONSE TO THE FEEDBACK INFORMATION, A REQUEST TO ADAPT THE REFERENCE CLOCK TO ALLOW THE ENCODING DEVICE TO INSERT INTRA-CODED VIDEO DATA INTO THE VIDEO BITSTREAM AT AN UNSCHEDULED TIME SLOT
1506

RECEIVE AN INDICATION THAT THE REFERENCE CLOCK IS UPDATED TO DEFINE AN UPDATED SCHEDULE
1508

INSERT, BASED ON THE UPDATED SCHEDULE, THE INTRA-CODED VIDEO DATA INTO THE VIDEO BITSTREAM ACCORDING TO THE UPDATED REFERENCE CLOCK
1510

FIG. 15

DYNAMIC VIDEO INSERTION BASED ON FEEDBACK INFORMATION

FIELD

This application is related to media-related technologies. For example, aspects of this application relate to systems, methods, and computer-readable media for performing dynamic video insertion based on feedback regarding loss or corrupted video information.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG)-related coding (e.g., MPEG-2 Part 2 coding), VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

Video can be used in many different media environments. One example of such a media environment is an extended reality (XR) system, which encompasses augmented reality (AR), virtual reality (VR), mixed reality (MR), among others. Each of these forms of XR allows users to experience or interact with virtual content, sometimes in combination with real content. XR systems need to provide low motion-to-photon latency, which is the delay from when user motion occurs to when the corresponding content is displayed. Low motion-to-photon latency is important in order to provide a good user experience and to prevent a user of a client device (e.g., a head-mounted display or HMD) from experiencing motion sickness or other adverse effect.

With ever-evolving video services becoming available, including XR technologies, encoding techniques with better coding efficiency and other video processing and management techniques are needed.

SUMMARY

Systems and techniques are described for adaptively controlling an encoding device (e.g., a video encoder in a split rendering boundless extended reality (XR) architecture, and/or other suitable system) based on feedback information indicating video data with missing (or lost) or corrupted video packets. The feedback information can indicate that a video frame, a video slice, a portion thereof, or other video information is missing packets or has corrupted packets. In one example, the feedback information can indicate that at least a portion of a video slice of a video frame is missing or corrupted. The portion of the video slice that is missing or corrupted can include certain packets of the video slice.

The feedback information can be provided to the encoding device from the client device. The encoding device can use the feedback information to determine when to adaptively insert intra-prediction coded frames (also referred to as intra-coded frames or pictures) or intra-prediction coded slices (also referred to as intra-coded slices) into an encoded video bitstream. The client device can rely on error concealment (e.g., asynchronous time warping (ATW) error concealment) until an error-free intra-coded frame or slice is received.

In some implementations, intra-coded frames (I-frames) can be dynamically inserted into an encoded video bitstream based on feedback information. For instance, I-frames can be dynamically inserted in an encoded video bitstream in systems having strict constant bit rate (CBR). In such implementations, using feedback from the client device indicating packet loss or corrupted packet information, the encoding device can relax (or even eliminate) the periodic insertion of I-frames into the encoding structure.

In some implementations, intra-coded slices (I-slices) with intra-refresh cycles can be dynamically inserted into an encoded video bitstream. An intra-refresh cycle spreads the intra-coded blocks of an I-frame over several frames. The slice sizes of the slices in an intra-refresh cycle can be made larger to ensure that the full lost slice with any possible propagated motion is covered by the intra-blocks of the intra-refresh slices. Using feedback information, the periodic insertion of intra-refresh cycles can be relaxed (or even eliminated in some cases).

In some implementations, individual I-slices can be dynamically inserted into an encoded video bitstream based on feedback information. For example, if allowed by the encoding device, the encoding device can insert I-slices in portions of the bitstream that are affected by error. The sizes of the I-slices can be made larger to ensure that the full lost slice with any possible propagated motion is covered by the intra-blocks of an I-slice. In some examples, the encoding device can decide to insert the needed I-slices over multiple frames in order not to introduce an instantaneous drop in quality.

In some examples, systems and techniques are also provided for synchronizing an encoding device to a common reference clock (e.g., set by a wireless access point or other device or entity) along with other encoding devices, which can help in multi-user environments. Synchronization to a common clock can help to reduce bitrate fluctuations over the wireless link regardless of the encoding configuration. In some cases, the encoding devices can be synchronized to the common clock with dynamic insertion of I-frames and/or I-slices. For instance, when one encoding device receives feedback indicative of one or more lost packets, and needs to force an I-frame or I-slice, any non-urgent (e.g., non-feedback based) I-frame and/or I-slice insertion from other encoding devices can be delayed so that the one encoding device can insert an I-frame or I-slice as soon as possible.

In one illustrative example of adaptive insertion of intra-prediction coded frames based on feedback information, a method of processing video data is provided. The method includes determining, by a computing device, at least a portion of a video slice of a video frame in a video bitstream is missing or corrupted. The method further includes sending feedback information to an encoding device. The feedback information indicates at least the portion of the video slice is missing or corrupted. The method further includes receiving an updated video bitstream from the encoding device in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, an apparatus for processing video data is provided that includes a memory and a processor implemented in circuitry and coupled to the memory. In some examples, more than one processor can be coupled to the memory. The processor is configured to determine at least a portion of a video slice of a video frame in a video bitstream is missing or corrupted. The processor is further configured to send feedback information to an encoding device. The feedback information indicates at least the portion of the video slice is missing or corrupted. The processor is further configured to receive an updated video bitstream from the encoding device in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, a non-transitory computer-readable medium of a computing device is provided that has stored thereon instructions that, when executed by one or more processors, cause the one or more processor to: determine at least a portion of a video slice of a video frame in a video bitstream is missing or corrupted; send feedback information to an encoding device, the feedback information indicating at least the portion of the video slice is missing or corrupted; and receive an updated video bitstream from the encoding device in response to the feedback information, the updated video bitstream including at least one intra-coded video slice having a size that is larger than the missing or corrupted video slice, wherein the size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, an apparatus for processing video data is provided. The apparatus includes means for determining at least a portion of a video slice of a video frame in a video bitstream is missing or corrupted. The apparatus further includes means for sending feedback information to an encoding device. The feedback information indicates at least the portion of the video slice is missing or corrupted. The apparatus further includes means for receiving an updated video bitstream from the encoding device in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In some aspects, the propagated error in the video frame caused by the missing or corrupted slice is based on a motion search range.

In some aspects, the missing or corrupted slice spans from a first row to a second row in the video frame, and the size of the at least one intra-coded video slice is defined to include the first row minus a motion search range to the second row plus the motion search range.

In some aspects, the method, apparatuses, and computer-readable medium described above can comprise performing, in response to determining at least the portion of the video slice is missing or corrupted, error concealment on one or more video frames until an error-free intra-coded video slice is received in the updated video bitstream.

In some aspects, the at least one intra-coded video slice includes an intra-coded frame. In some aspects, the at least one intra-coded video slice is included as part of an intra-refresh cycle. The intra-refresh cycle includes at least one video frame, each video frame of the at least one video frame including one or more intra-coded video slices. In some examples, a number of the at least one video frame of the intra-refresh cycle is based on at least one of a number of slices in the video frame including the video slice, a location of the video slice in the video frame, and when the intra-refresh cycle is inserted into the updated video bitstream based on the feedback information.

In one example, when the location of the video slice is a first slice in the video frame, the at least one video frame of the intra-refresh cycle includes at least two frames. In such an example, the method, apparatuses, and computer-readable medium described above can comprise performing error concealment on a first frame of the at least two frames and not on a second frame of the at least two frames, the second frame being subsequent to the first frame in the video bitstream. In another example, when the location of the video slice is not a first slice in the video frame, the at least one video frame of the intra-refresh cycle includes an intra-coded frame. In another example, when the location of the video slice is a last slice in the video frame, the at least one video frame of the intra-refresh cycle includes at least two frames. In such an example, the method, apparatuses, and computer-readable medium described above can comprise performing error concealment on a first frame and a second frame of the at least two frames based on the video slice being a last slice in the video frame.

In some implementations, the computing device and/or the apparatus includes an extended reality display device configured to provide motion information to the encoding device for generating the video bitstream for display by the extended reality display device.

In another illustrative example of adaptive insertion of intra-prediction coded frames based on feedback information, a method of processing video data is provided. The method includes receiving, at an encoding device, feedback information from a computing device. The feedback information indicates at least a portion of a video slice of a video frame in a video bitstream is missing or corrupted. The method further includes generating an updated video bitstream in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, an apparatus for processing video data is provided that includes a memory and a processor implemented in circuitry and coupled to the memory. In some examples, more than one processor can be coupled to the memory. The processor is configured to receive, feedback information from a computing device. The feedback information indicates at least a portion of a video slice of a video frame in a video bitstream is missing or corrupted. The processor is further configured to generate an updated video bitstream in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, a non-transitory computer-readable medium of an encoding device is provided that has stored thereon instructions that, when executed by one or more processors, cause the one or more processor to: receive feedback information from a computing device, the feedback information indicating at least a portion of a video slice of a video frame in a video bitstream is missing or corrupted; and generate an updated video bitstream in response to the feedback information, the updated video bitstream including at least one intra-coded video slice having a size that is larger than the missing or corrupted video slice, wherein the size of the at least one intra-coded video slice is determined to cover (or compensate for) the missing or corrupted slice and propagated error in the video frame caused by the missing or corrupted slice.

In another example of adaptive insertion of intra-prediction coded frames based on feedback information, an apparatus for processing video data is provided. The apparatus includes means for receiving feedback information from a computing device. The feedback information indicates at least a portion of a video slice of a video frame in a video bitstream is missing or corrupted. The apparatus further includes means for generating an updated video bitstream in response to the feedback information. The updated video bitstream includes at least one intra-coded video slice having a size that is larger than the missing or corrupted video slice. The size of the at least one intra-coded video slice is determined to cover (or compensate for) the missing or corrupted slice and propagated error in the video frame caused by the missing or corrupted slice.

In some aspects, the propagated error in the video frame caused by the missing or corrupted slice is based on a motion search range.

In some aspects, the missing or corrupted slice spans from a first row to a second row in the video frame. In such aspects, the method, apparatuses, and computer-readable medium described above can comprise determining the size of the at least one intra-coded video slice to include the first row minus a motion search range to the second row plus the motion search range.

In some aspects, in response to at least the portion of the video slice being missing or corrupted, error concealment is performed on one or more video frames until an error-free intra-coded video slice is received in the updated video bitstream.

In some aspects, the at least one intra-coded video slice includes an intra-coded frame. In some aspects, the at least one intra-coded video slice is included as part of an intra-refresh cycle. The intra-refresh cycle includes at least one video frame, each video frame of the at least one video frame including one or more intra-coded video slices. In some examples, the method, apparatuses, and computer-readable medium described above can comprise determining a number of the at least one video frame of the intra-refresh cycle based on at least one of a number of slices in the video frame including the video slice, a location of the video slice in the video frame, and when the intra-refresh cycle is inserted into the updated video bitstream based on the feedback information.

In one example, when the location of the video slice is a first slice in the video frame, the at least one video frame of the intra-refresh cycle is determined to include at least two frames. In such an example, error concealment can be performed on a first frame of the at least two frames and not on a second frame of the at least two frames, the second frame being subsequent to the first frame in the video bitstream. In another example, when the location of the video slice is not a first slice in the video frame, the at least one video frame of the intra-refresh cycle is determined to include an intra-coded frame. In another example, when the location of the video slice is a last slice in the video frame, the at least one video frame of the intra-refresh cycle is determined to include at least two frames. In such an example, error concealment can be performed on a first frame and a second frame of the at least two frames based on the video slice being a last slice in the video frame.

In some aspects, the method, apparatuses, and computer-readable medium described above can comprise storing the updated video bitstream. In some aspects, the method, apparatuses, and computer-readable medium described above can comprise transmitting the updated video bitstream to the computing device.

In some aspects, the method, apparatuses, and computer-readable medium described above can comprise: adding intra-coded video data to the video bitstream according to a reference clock shared with at least one other encoding device, the reference clock defining a schedule for staggering intra-coded video from the encoding device and the at least one other encoding device; sending, in response to the feedback information, a request to adapt the reference clock to allow the encoding device to add intra-coded video data to the video bitstream at an unscheduled time slot; receiving an indication that the reference clock is updated to define an updated schedule; and adding, based on the updated schedule, the intra-coded video slice to the video bitstream according to the updated reference clock.

In some implementations, the computing device includes an extended reality display device, and the encoding device is part of a server. The encoding device is configured to generate the video bitstream for display by the extended reality display device based on motion information received by the encoding device from the extended reality display device.

In one illustrative example of encoding device synchronization to a common reference clock, a method of processing video data is provided. The method includes generating, by an encoding device, a video bitstream. Intra-coded video data is inserted into the video bitstream (e.g., by the encoding device) according to a reference clock shared with at least one other encoding device. The reference clock defines a schedule for staggering intra-coded video from the encoding device and the at least one other encoding device. The method further includes obtaining, by the encoding device, feedback information indicating at least a portion of a video slice of the video bitstream is missing or corrupted. The method further includes sending, in response to the feedback information, a request to adapt the reference clock to allow the encoding device to insert intra-coded video data into the video bitstream at an unscheduled time slot. The method further includes receiving an indication that the reference clock is updated to define an updated schedule, and inserting, based on the updated schedule, the intra-coded video data into the video bitstream according to the updated reference clock.

In another example of encoding device synchronization to a common reference clock, an apparatus for processing video data is provided that includes a memory and a processor implemented in circuitry and coupled to the memory. In some examples, more than one processor can be coupled to the memory. The processor is configured to generate a video bitstream. Intra-coded video data is inserted into the video bitstream (e.g., by the apparatus, which can include an encoding device) according to a reference clock shared with at least one other encoding device. The reference clock defines a schedule for staggering intra-coded video from the encoding device and the at least one other encoding device. The processor is further configured to obtain feedback information indicating at least a portion of a video slice of the video bitstream is missing or corrupted. The processor is further configured to send, in response to the feedback information, a request to adapt the reference clock to allow the encoding device to insert intra-coded video data into the video bitstream at an unscheduled time slot. The processor is further configured to receive an indication that the reference clock is updated to define an updated schedule. The processor is further configured to insert, based on the updated schedule, the intra-coded video data into the video bitstream according to the updated reference clock.

In another example of encoding device synchronization to a common reference clock, a non-transitory computer-readable medium of an encoding device is provided that has stored thereon instructions that, when executed by one or more processors, cause the one or more processor to: generate a video bitstream, wherein intra-coded video data is inserted into the video bitstream according to a reference clock shared with at least one other encoding device, the reference clock defining a schedule for staggering intra-coded video from the encoding device and the at least one other encoding device; obtain feedback information indicating at least a portion of a video slice of the video bitstream is missing or corrupted; send, in response to the feedback information, a request to adapt the reference clock to allow the encoding device to insert intra-coded video data into the video bitstream at an unscheduled time slot; receive an indication that the reference clock is updated to define an updated schedule; and insert, based on the updated schedule, the intra-coded video data into the video bitstream according to the updated reference clock.

In another example of encoding device synchronization to a common reference clock, an apparatus for processing video data is provided. The apparatus includes means for generating a video bitstream. Intra-coded video data is inserted into the video bitstream (e.g., by the encoding device) according to a reference clock shared with at least one other encoding device. The reference clock defines a schedule for staggering intra-coded video from the encoding device and the at least one other encoding device. The apparatus further includes means for obtaining feedback information indicating at least a portion of a video slice of the video bitstream is missing or corrupted. The apparatus further includes means for sending, in response to the feedback information, a request to adapt the reference clock to allow the encoding device to insert intra-coded video data into the video bitstream at an unscheduled time slot. The apparatus further includes means for receiving an indication that the reference clock is updated to define an updated schedule, and means for inserting, based on the updated schedule, the intra-coded video data into the video bitstream according to the updated reference clock.

In some aspects, based on the updated schedule, the at least one other encoding device delays scheduling intra-coded video relative to a previously scheduled time slot defined by the reference clock.

In some aspects, a plurality of encoding devices are synchronized to the reference clock. In such aspects, each encoding device of the plurality of encoding devices can be assigned a different time reference by which to transmit encoded data. In some cases, a first time reference assigned to the encoding device is different than a second time reference assigned to the at least one other encoding device.

In some aspects, the unscheduled time slot deviates from a plurality of time slots defined by the reference clock for the encoding device.

In some aspects, the updated reference clock is shared with the at least one other encoding device.

In some aspects, the intra-coded video data includes one or more intra-coded video frames. In some aspects, the intra-coded video data includes one or more intra-coded video slices. In some aspects, the intra-coded video data includes an intra-refresh period, the intra-refresh period including at least one video frame. For instance, each video frame of the at least one video frame can include one or more intra-coded video slices.

In some aspects, the feedback information is provided from a computing device. In some implementations, the computing device includes an extended reality display device, and the encoding device is part of a server. The encoding device is configured to generate the video bitstream for display by the extended reality display device based on motion information received by the encoding device from the extended reality display device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4 is a diagram illustrating an example of a video coding structure using dynamic intra-coded frames (I-frames) with strict constant bitrate (CBR), in accordance with some examples;

FIG. 5 is a diagram illustrating an example of a video coding structure for dynamic intra-coded slices (I-slices) with a intra-refresh cycle in an error-free link, in accordance with some examples;

FIG. 6A-FIG. 6D are diagrams illustrating examples of video coding structures using dynamic I-slices, in accordance with some examples;

FIG. 7A-FIG. 7F are diagrams illustrating other examples of video coding structures using dynamic I-slices, in accordance with some examples;

FIG. 8A-FIG. 8H are diagrams illustrating other examples of video coding structures using dynamic I-slices, in accordance with some examples;

FIG. 10 is a diagram illustrating an example of a system including encoding devices that are synchronized with a reference clock, in accordance with some examples;

FIG. 12 is a diagram illustrating another example of video coding structures, with dynamic I-frames, of two encoding devices that are synchronized with a reference clock, in accordance with some examples;

FIG. 13 is a flowchart illustrating an example of a process for processing video data, in accordance with some examples;

FIG. 14 is a flowchart illustrating another example of a process for processing video data, in accordance with some examples;

FIG. 15 is a flowchart illustrating another example of a process for processing video data, in accordance with some examples.

DETAILED DESCRIPTION

Figure 1:
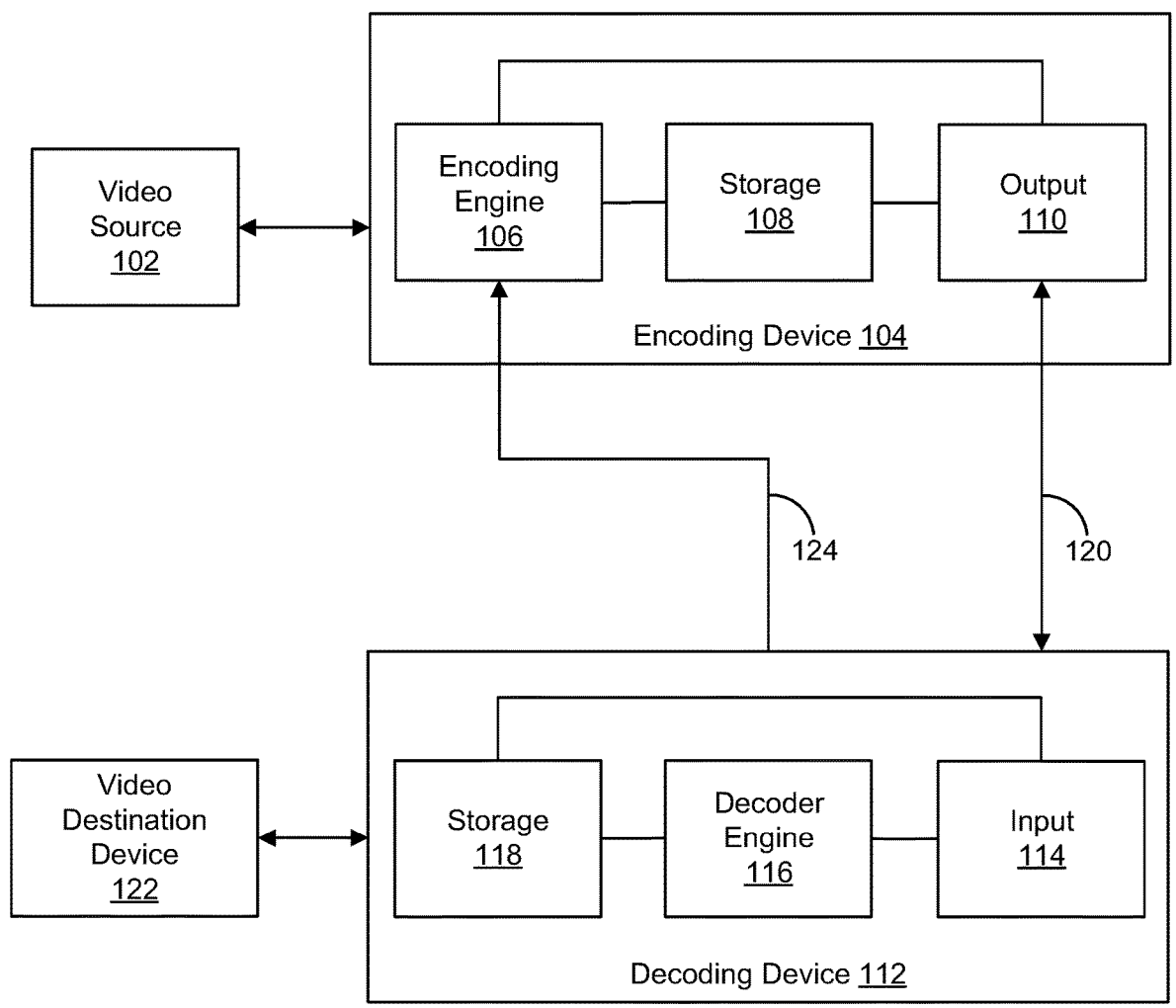
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems and techniques are described herein for adaptively controlling an encoding device, such as a video encoder or other type of encoding device, based on feedback information (indicating video data with missing or corrupted video packets) provided to the video encoder from a client device. For example, the video encoder can use the feedback information to determine when to adaptively insert intra-coded frames (also referred to as pictures) and/or intra-coded slices into an encoded video bitstream. Systems and techniques are also described for synchronizing an encoding device to a common reference clock (e.g., set by a wireless access point or other device) along with other encoding devices, which can help schedule video traffic in multi-user environments.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients.

The difference between the reconstructed frame and the original frame is called reconstruction error.

The techniques described herein can be applied to one or more of a variety of block based video coding techniques in which video is reconstructed on block-by-block basis. For example, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AV1, and/or other video coding standard in development or to be developed.

Figure 2:
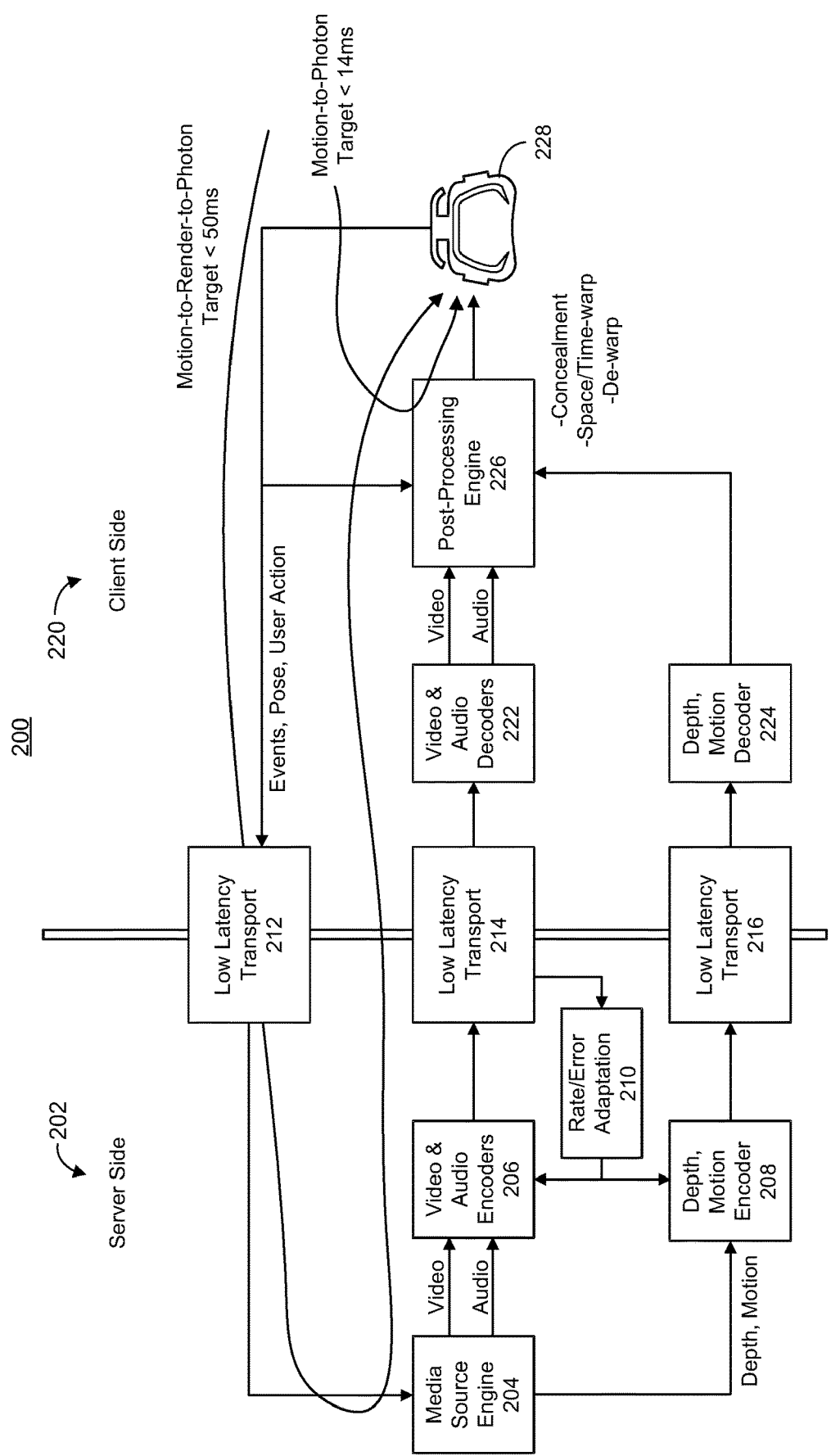
FIG. 2 is a block diagram illustrating an example of an extended reality (XR) split rendering system, in accordance with some examples.

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a server device in a server system including one or more server devices (e.g., an extended reality (XR) split rendering system, a video streaming server system, or other suitable server system), a head-mounted display (HMD), a heads-up display (HUD), smart glasses (e.g., virtual reality (VR) glasses, augmented reality (AR) glasses, or other smart glasses), a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, or any other suitable electronic device. In one illustrative example, as shown in FIG. 2 and described in more detail below, the source device can include a server and the receiving device can include an XR client device (e.g., an HMD or other suitable device) in an XR split rendering system. In some examples, the source device and the receiving device may include one or more wireless transceivers for wireless communications.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and AV1 are other video coding standards that can be used.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs.

Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
|---|---|
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

The decoding device 112 can monitor the encoded video bitstream received from the encoding device 104, and can detect when packets become missing or corrupted. For example, a video bitstream (or media file containing the video bitstream) may include corrupted or missing video frames (or pictures) in the encoded data. A missing frame may occur when all the encoded data of that missing frame is lost. A corrupted frame may occur in different ways. For example, a frame may become corrupted when packets of the frame or when part of the encoded data for that frame is lost. As another example, a frame may become corrupted when the frame is part of an inter-prediction chain, and some other encoded data of the inter-prediction chain is lost or corrupted such that the frame cannot be correctly decoded. For instance, an inter-coded frame that relies on one or more reference frames for prediction may not be decodable if the one or more reference frames are missing or corrupted.

In response to detecting frames, slices, or other video with missing packets, the decoding device 112 can send feedback information 124 to the encoding device 104. The feedback information 124 can indicate that a video frame, a video slice, a portion thereof, or other video information is missing or is corrupted (referred to herein as a "corrupted video frame," a "corrupted video slice" or other type of corrupted video data). The feedback information 124 can be used by the encoder engine 106 to determine whether to adaptively insert intra-prediction coded frames (also referred to as intra-coded frames or pictures) or intra-prediction coded slices (also referred to as intra-coded slices) into an encoded video bitstream. For example, as described in more detail below, the encoder engine 106 can dynamically insert I-frames into the encoded video bitstream and/or can dynamically insert I-slices (e.g., individual I-slices and/or I-slices with intra-refresh cycles) into an encoded video bitstream based on the feedback information 124. In some cases, in response to detecting the corrupted video data, the receiving device including the decoding device 112 can rely on error concealment (e.g., asynchronous time warping (ATW) error concealment) until an error-free intra-coded frame, slice, or other video data is received.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As noted above, in some examples, the source device can include a server and the receiving device can include an extended reality (XR) client device (e.g., an HMD, smart glasses, or other suitable device) in an XR system. XR encompasses augmented reality (AR), virtual reality (VR), mixed reality (MR), among others. Each of these forms of XR allows users to experience or interact with virtual content, sometimes in combination with real content.

A split rendering boundless XR system is a type of XR system that splits the XR processing burden between the server side and the client side (e.g., the side with an XR headset, such as an HMD). FIG. 2 is a block diagram illustrating an example of an XR split rendering system 200 including a server side 202 (corresponding to components of a server) and a client side 220 (corresponding to components of a client device or receiving device). The XR split rendering system 200 can split the processing burden of XR applications (e.g., virtual reality (VR), augmented reality (AR), mixed reality (MR), or other XR application) between the server side 202 and the client side 220. For example, the client device on the client side 220 can perform on-device processing augmented by compute resources located on the server side 202 over wireless connectivity (e.g., using broadband connectivity, such as 4G, 5G, or the like, using WiFi connectivity, or other wireless connection). In one example, the server side 202 can be at the cloud edge in a wireless network (e.g., a broadband network, such as a 5G network).

The split processing between the client side 220 and the server side 202 enables photorealistic, high-quality, immersive experiences. Various advantages are obtained by performing rendering of the content and other processing on the server side 202. For example, the server side 202 provides a higher processing capacity and heat dissipation capabilities than a client device on the client side 220, which can be advantageous when a client device is a lightweight XR headset (e.g., a head-mounted display) that may have limited processing, battery, and/or heat dissipation characteristics. The higher processing capability of the server side 202 can allow resource intensive applications (e.g., multi-player games, multi-user video conferencing, multi-user video applications, among others) to be rendered at the server side 202 and displayed at the client side 220 at high-quality and with low latency.

The server side 202 includes various components, including a media source engine 204, video and audio encoders 206, a depth/motion encoder 208, and a rate/error adaptation engine 210. The client side 220 also includes various components, including video and audio decoders 222, depth/motion decoder 224, post-processing engine 226, and display 228. Low latency transport links 212, 214, and 216 are also used to transport data between the server side 202 and the client side 220.

The components of the XR split rendering system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the XR split rendering system 200 is shown to include certain components, one of ordinary skill will appreciate that the XR split rendering system 200 can include more or fewer components than those shown in FIG. 2. For example, the XR split rendering system 200 can also include one or more input devices and one or more output devices (not shown). The XR split rendering system 200 may also include, in some instances, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more other wireless interfaces (e.g., including one or more transceivers and one or more baseband processors for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

In some examples, the client device on the client side 220 can include an XR headset, such as an HMD, XR glasses, or other suitable head-mounted device with a display. In some cases, the XR headset can perform the client-side functions needed to display XR content. In some examples, the client device can include multiple devices, such as an XR headset in wired or wireless communication with a computing device, such as a smartphone, tablet, personal computer, and/or other device. For instance, the computing device can perform client-side processing functions needed to prepare XR content for rendering or display (e.g., error concealment, de-warping of one or more images in one or more video frames, processing to minimize motion-to-photon latency, among other functions), and the XR headset can display content based on the processing performed by the computing device.

Using a client device, when a user of the XR headset moves her head, the on-device processing (e.g., of the XR headset or a computing device connected wirelessly or through a wired connection to the XR headset, not shown) determines the head pose and sends the pose to the server side 202 (e.g., to the media source engine 204, to the video and audio encoders 206, and/or to the depth, motion encoder 208) through a low-latency transport link 212, which can include a high quality-of-service communications link (e.g., a 5G link, a WiFi link, or other communications link). The media source engine 204 can use the head pose to partially render the next video frame and audio frame, and can output the video and audio frames to the video and audio encoders 206. The media source engine 204 can also use the head pose to render depth and motion information, which can be output to the depth/motion encoder 208.

The media source engine 204 can include any source of media data, such as a game engine, a streaming media source, a video on demand content source, or other media source. In some implementations, the media source engine 204 can provide immersive media content that provides an immersive user experience to a user of the client device. Examples of immersive media content include 360-degree (or virtual reality (VR)) video, 360-degree (or VR) video game environments, and other virtual or synthetic visualizations. With such immersive media content, a head pose of a user (e.g., corresponding to a position and/or orientation of an XR headset) reflects a viewing direction and/or field of view in relation to the immersive content. For example, when a user of an XR headset turns her head to the right, the media source engine 204 can render immersive media content so that a virtual scene is adjusted to where the user expects to see based on the new head position and orientation. In some cases, eye gaze and/or eye focus (e.g., for depth-based functions) can be used to determine user interaction with the immersive environment. For instance, eye gaze information indicating where a user is staring in a virtual scene may be provided and used by the media source engine 204 to determine a selection of an object in the scene, to determine a portion of the scene to emphasize, to present augmented content in the scene, to cause an object in the scene (e.g., a character) to react, and/or to perform other operations based on the eye gaze information.

The video and audio encoders 206 encode the video and audio data, and send the encoded audio-video data to the client side 220 over a low-latency transport link 214. The encoded data can also be sent to rate/error adaptation engine 210. The rate/error adaptation engine 210 can adjust the bitrate based on communications channel information. The depth/motion encoder 208 can encode the depth and motion data, and send the encoded depth and motion data to the client side 220 over a low-latency transport link 216.

The video and audio decoders 222 on the client side 220 decode the received audio-video data. The depth/motion decoder 224 can decode the received depth and motion data. The decoded audio-video data and the decoded depth and motion data can be provided to the post-processing engine 226. Based on the latest head pose (which is being generated at a high frequency by the client device), the post-processing engine 226 can perform any further rendering and adjustment that is needed. The post-processing can include error concealment (e.g., asynchronous time warp (ATW) or other type of error concealment) used to conceal errors in the video and/or audio data, space warp (frame-rate smoothing), de-warping of the images in the video frames, processing to minimize motion-to-photon latency, among other post-processing functions. The post-processing can be performed on the client device in order to meet a latency threshold (e.g., 14 milliseconds (ms), 20 ms, or other suitable threshold) that is needed to avoid user discomfort. For example, a high motion-to-photon latency can prevent true immersion in a virtual environment and can cause discomfort to the user.

Motion-to-photon latency is the delay from when user motion occurs to when the corresponding content is displayed. For example, motion-to-photon latency can include the length of time between the user performing a motion (e.g., turning the head to the right or left) and the display showing the appropriate content for that particular motion (e.g., the content on the HMD subsequently moving to the right or left). The term "photon" is used to specify that all parts of the display system are involved in this process, up until the point when photons are emitted from the display.

It can be crucial to minimize motion-to-photon latency in order to provide an immersive experience for a user. For example, humans are highly sensitive to such latency, and can become sick or disoriented if too much lag is present. In some cases, for VR content, up to 20 ms of lag can remain undetected by the user. Low motion-to-photon latency is important in order to provide a good user experience and to prevent a user of a client device (e.g., a head-mounted display or HMD) from experiencing motion sickness or other adverse effect.

With a boundless split rendering system, such as the XR split rendering system 200, there can be even more latency due to the client sending events, poses, user interaction, and other information to the server, and the server rendering the XR scene based on the information, encoding the content, and sending the rendered content to the client device for decoding and display. Such latency can be referred to as motion-to-render-to-photon latency. For example, the motion-to-render-to-photon latency can be the length of time between the user performing a motion, the server side 202 rendering the appropriate content for the particular motion, the content being provide to the client side 220, and the display showing the appropriate content for that particular motion.

The video encoding and decoding portion of the boundless XR system can affect the latency of an XR system. For example, video content having a higher bitrate can require more bandwidth for transmission than lower bitrate video content. Due to the live nature of some XR content and the quality requirements of these systems, a constant bit rate (CBR) scheme can be used in order to ensure a certain quality is maintained. In some cases, high bitrate video frames (e.g., I-frames and I-slices, which are larger than inter-coded frames) are periodically inserted into an encoded video bitstream, even when those frames may not be needed at such frequency. As described above, an I-frame is a frame that is only coded by intra-prediction using data within the frame. An I-frame is independently decodable because the I-frame requires only the data within the frame to predict any prediction unit or prediction block of the frame. A P-frame can be encoded with intra-prediction and with uni-directional inter-prediction, and B-frame can be encoded with intra-prediction, with uni-directional inter-prediction, or bi-directional inter-prediction. A frame can be partitioned into multiple slices, with each slice including one or more blocks of the frame. Similarly, an I-slice (including I-frames) is an independently decodable slice of a frame that is only coded using blocks within the slice.

Techniques are described for adaptively controlling an encoding device (e.g., in a split rendering XR system or other video-related system) based on feedback information provided to the encoding device from a client device or other device (e.g., a network device, such as an access point (AP), a server on the server side 202, or other device), such as the feedback information 124 provided from the decoding device 112 to the encoding device 104. In an XR split rendering system, the encoding device 104 can be located at the server side (e.g., server side 202 in FIG. 2), and the decoding device 112 can be located at the client side (e.g., client side 220 in FIG. 2). The feedback information can indicate to the encoder that video data is missing or corrupted. While examples of missing or corrupted video data described below use frames and slices as examples, one of ordinary skill will appreciate that any portion of video can be detected as having missing packets, such as groups of frames, blocks of frames (e.g., a CU, PU, or other block), or other suitable video data.

Video data can become missing or corrupted due to various factors. A video communications system can perform various steps from encoding to decoding of the video data. For example, the video can first be compressed by a video encoder (as described above) to reduce the data rate of the video. The encoded video bitstream can then segmented into fixed or variable length packets and multiplexed with other data types, such as audio and/or metadata. The packets can be sent directly over a network, or can undergo a channel encoding stage (e.g., using forward error correction (FEC) and/or other techniques) to protect the packets from transmission errors. At the receiving device (or client device), the received packets can be channel decoded (e.g., FEC decoded) and unpacked, and the resulting encoded video bitstream can be provided to a video decoder to reconstruct the original video.

Unless a dedicated link that can provide a guaranteed quality of service (QoS) is available between the video source and the receiving device, data packets may be lost or corrupted, such as due to traffic congestion or bit errors caused by impairment of the physical channels. A missing frame can occur when all the encoded data (e.g., all packets) of that missing frame is lost. A corrupted frame (with corrupted packets or data) can occur in different situations. For instance, a frame can become corrupted when part (e.g., some packets but not all packets) of the encoded data for that frame is lost. Further, compressed video streams are sensitive to transmission errors because of the use of predictive coding by the encoding device at the source. For instance, due to the use of spatio-temporal prediction, a single erroneously recovered sample can lead to errors in subsequent samples (received after the erroneously recovered sample) in the same frame and in following frames. In one example, a frame can become corrupted when the frame is part of an inter-prediction chain, and some other encoded data of the inter-prediction chain is lost (or corrupted) so that the frame cannot be correctly decoded. An inter-coded frame that relies on one or more reference frames for prediction may not be decodable if the one or more reference frames are missing or corrupted. There error can continue to propagate as the prediction chain continues. For example, an error in a previously-decoded frame (a reference frame) can result in a current frame not being decoded correctly, creating a degradation in the video data of the decoded frames. The degradation in the video data will continue to propagate to subsequent inter-coded frames until an I-frame or I-slice is encountered.

When packets are lost or corrupted, the quality of the video is degraded and a poor user experience can occur. For example, a user of an XR headset playing a live multi-user game can experience poor video quality when packets are lost or corrupted. In another example, a user watching live video or video provided by a streaming service can experience degraded video quality when packets are lost or corrupted. The poor or degraded video quality can be visualized by a user as a freeze in the displayed content (where displayed content is momentarily paused), jerky or erratic visual effects of the displayed content, motion blurring, among others.

In such situations, error-free delivery of data packets can be achieved by allowing retransmission of lost or damaged packets, using techniques such as Automatic Repeat Request (ARQ). However, retransmitting lost or damaged packets can cause delays that are unacceptable for certain real-time applications, such as XR applications, broadcast applications, or other real-time applications. For instance, broadcast applications may prevent the use of retransmission algorithms due to network flooding considerations.

The techniques described herein provide video coding schemes that allow dynamic adjustment of the video bitstream so that the data is resilient in view of transmission errors. As described in more detail below, the encoding device can use feedback information from a client device (or other device, such as a network device) indicating that video data is missing or corrupted to determine when to adaptively insert I-frames, I-slices (with or without intra-refresh cycles), or other video data into an encoded video bitstream. The insertion of an I-frame or an I-slice can terminate the error propagation, due to I-frames being predicted using only video data within the frame.

For any of the techniques described herein, the client device can rely on error concealment until an error-free I-frame or I-slice is received. In one illustrative example, asynchronous time warping (ATW) error concealment can be performed by the client device in an XR based system, such as a split rendering XR system. The ATW error concealment can use information from previous frames to conceal the lost packets. For example, using ATW, a previous frame (a frame before the frame that is corrupted or missing) can be warped to generate a current frame. The warping can be performed to reflect the head motion since the previous frame was rendered. In one example, updated orientation information can be retrieved for the client device just before applying the time warp, and a transformation matrix can be calculated that warps eye buffers (e.g., a stereo view of a virtual scene rendered from the position and/or orientation of one or both of a user's eyes) from where they were at the previous frame to where they should be at the time the current frame is to be displayed. Although the newly generated current image will not be exactly the same as if the current frame was rendered by the rendering engine, because the previous frame was adjusted for head rotation, displaying the warped previous frame as the current frame will reduce judder and other effects as compared to displaying the previous frame again.

In some cases, performance of error concealment by a client device for long periods of time can be tolerated in applications that allow client side buffering of content. In some cases, if a client can buffer content, the client can request retransmission of corrupted packets, in which case there may be no need for error concealment (at the expense of increased latency). While error concealment (e.g., ATW error concealment) can be performed by a client device until an error-free I-frame or I-slice is received, it can beneficial (and even crucial in some applications) to limit the delay in correcting the effect of frames, slices, or other video data with missing packets. For example, in systems that are latency sensitive, such as in systems that deliver live content in real-time (e.g., in some split rendering XR systems, live video streaming and/or broadcasting, among others), client-side devices may not be able to buffer content locally, and thus there can be a limit on the amount of delay that can be tolerated. In such systems, the amount of time a client device has to perform error concealment may be limited. For example, there can be a maximum acceptable amount of time that error concealment can be performed by the client device in some latency-sensitive systems.

As described in more detail below, the systems and techniques described herein can limit the delay in receiving I-frames, I-slices, or other intra-coded data. For example, to expedite the recovery of the video bitstream, a full I-frame or I-slice can be inserted to immediately terminate the error propagation. In another example, I-slices can be spread out over an intra-refresh cycle in order to limit the spike in bitrate (and corresponding drop in quality) required to insert an I-frame. The number of frames included in the intra-refresh cycle and/or the size of I-slices in the intra-refresh cycle can be defined based on various factors described below, allowing a compromise to be made between limiting the spike in bitrate and limiting the amount of time a client device has to perform error concealment. Each frame of the intra-refresh cycle can include a single slice, or can include multiple slices. Video content has a bitrate, which is the amount of data that the video transfers per period of time (e.g., in bits per second). High bitrates lead to higher bandwidth consumption and larger delays. For instance, if the available bandwidth is less than the bitrate, receipt of the video may be delayed or stopped altogether. As a result, a spike in bitrate can cause delays in data being received by a client device (e.g., video content sent from the server side 202 to the client side 220 in the XR split rendering system 200). Avoiding spikes in bitrate can reduce the bandwidth that is required for transmission of video content and in-turn can decrease latency, which can be important in latency-sensitive systems and applications.

Figure 3:
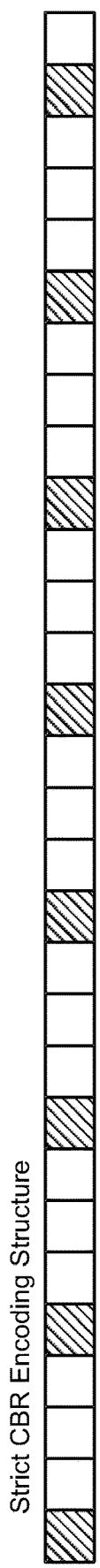
FIG. 3 is a diagram illustrating an example of a video coding structure using strict constant bitrate (CBR), in accordance with some examples.

Various techniques will now be described for dynamically inserting I-frames or I-slices (with or without intra-refresh cycles) into an encoded video bitstream based on feedback information indicating that lost or corrupted packets have been detected. In some cases, I-frames can be dynamically inserted into a bitstream in systems having strict constant bitrate (CBR) encoding structure by limiting the frame size using a restricted Video Buffering Verifier (VBV) buffer size or Hypothetical Reference Decoder (HRD) buffer size. Such a technique assumes an encoder can enforce a frame to be an I-frame. FIG. 3 is a diagram illustrating an example of a video coding structure using strict CBR. As shown in the strict CBR encoding structure of FIG. 3, a default encoding structure of IPPPIPPPI . . . is used (where I indicates an I-frame and P indicates a P-frame), with one reference frame (hence, the P-frames). As noted above, the strict CBR encoding structure can be obtained using a restricted VBV buffer size or restricted HRD buffer size. The VBV and HRD (for AVC, HEVC, etc.) are theoretical video buffer models, and are used as a constraint to ensure that an encoded video bitstream can be correctly buffered, and played back at a decoder device. By definition, a VBV is not to overflow or underflow when the input to the VBV is a compliant stream, and thus an encoder, when encoding a bitstream, must comply with the VBV requirements. For a CBR encoding structure, the buffer of the decoding device is filled over time at a constant data rate.

In the strict CBR encoding structure of FIG. 3, an I-frame is periodically inserted once every four frames. Using feedback information from the client device (or other device) indicating that video data is missing or corrupted, the encoding device can relax (or even eliminate) the periodic insertion of I-frames into the encoding structure. For example, when an encoding device (e.g., in a server of an XR split rendering system) receives feedback indicating one or more packets of a video frame have been lost or are corrupted, the encoding device can react by forcing the next frame in the encoded video bitstream to be encoded as an I-frame.

As noted above, the dynamic insertion of the I-frames based on the feedback information allows the period of the I-frame insertion to be reduced or even eliminated in some cases. For example, in some cases, the period at which I-frames are inserted can be increased as compared to the typical strict CBR encoding structure (e.g., one I-frame every 35 frames instead of one I-frame every four frames). In some cases, I-frames can only be inserted in response to feedback indicating a lost or corrupted video frame has been detected, in which case the periodic insertion is eliminated because I-frames will not be periodically inserted into the bitstream. The restricted VBV (or HRD) buffer size in a CBR structure may cause an instantaneous drop in peak signal-to-noise ratio (PSNR) with the I-frame, due to the I-frame having a higher bitrate than the P-frames. However, the drop in PSNR can be negligible given the high operating bitrate of certain systems, such as XR systems.

FIG. 4 is a diagram illustrating an example of the dynamic I-frame insertion in an encoded video bitstream having a strict CBR encoding structure. As shown in FIG. 4, the first frame 402 in the CBR bitstream is an original I-frame that is periodically inserted into the encoded video bitstream. The periodic rate of inserting I-frames into the encoded video bitstream is at a rate of once every 35 frames (as shown by the gap between the first I-frame 402 and the next I-frame 408). Once a lost packet is detected by a client device, the encoding device can force a next frame to be an I-frame by performing intra-prediction on the next frame. For example, a client device can receive the encoded video bitstream, and can detect that one or more packets of the video frame 404 are missing or corrupted. In some cases, if a packet of a slice is missing or corrupted, the whole slice is not decodable. In some cases, header information can be used to detect whether one or more packets are missing or corrupted. For instance, the encoding device (or other device) can add a header for each packet. The header can include information indicating which slice the header belongs to, and also which blocks (e.g., macroblocks, CTUs, CTBs, or other block) are covered by the slice. In one illustrative example, the information in the header can indicate the first and last block covered by the packet. The information in the packet header can be parsed by the client device to detect missing packets. The client device can then send feedback information (e.g., feedback information 124 in FIG. 1) to the encoding device with an indication that the video frame has missing or lost packets. The encoding device can force the video frame 406 to be coded using intra-prediction, even if the decoding order of the video frame is not scheduled to be an I-frame according to the periodic I-frame insertion.

There is a delay from when the client device detects the missing or corrupted data in the video frame 404, and when the encoding device can insert the forced I-frame 404 into the bitstream. The delay can be based on the amount of time it takes to detect the missing or corrupt data, an amount of time it takes to transmit the feedback information to the encoding device, and an amount of time the encoding device takes to perform the intra-prediction and other coding processes for the video frame 406. Based on the delay, there is a gap between the video frame 404 that is detected as being lost or corrupted and the dynamically inserted forced I-frame 406. As noted above, the client device can perform error concealment on the video frames of the bitstream (e.g., the frame between the missing or corrupted frame 404 and the forced I-frame 406) until the forced I-frame 406 is received. Once the I-frame is received, the client device can stop performing the error concealment.

Reducing the rate at which I-frames are inserted into the bitstream can allow more instances of lower bitrate frames (e.g., P-frames and/or B-frames) to be included in the encoded video bitstream. Reducing the number of I-frames can provide various benefits. For example, reducing the number of I-frames allows the system to operate at an overall lower average bitrate based on the lower bitrate of other types of frames (e.g., P-frames and/or B-frames).

Another technique that can be performed using feedback information is to dynamically insert I-slices with intra-refresh cycles into a bitstream. Such a technique assumes an encoder can enforce an I-frame and an intra-refresh cycle. An intra-refresh cycle spreads the intra-coded blocks of an I-frame over several frames. In one example of an I-frame with four I-slices, one I-slice of the I-frame can be included in each of four consecutive frames, with the other slices of the four consecutive frames including P-frames (or B-frames in some cases). In some cases, multiple I-slices can be included in a frame (or in multiple frames) of the intra-refresh cycle. An intra-refresh cycle can help to prevent the spike in frame size that occurs when a full I-frame is inserted in the bitstream. The spike in frame size can increase latency, cause jitter, and can cause other problems, in particular for XR-related applications. Preventing a spike in frame size can be advantageous for XR-related applications (e.g., providing immersive media consumption), multi-user applications, and other applications that generally demand higher bandwidth and/or that are more latency sensitive as compared to other types of media. For example, some XR-related applications consume large amounts of data and are sensitive to delays, in which case reducing the number of I-frames or I-slices can help to reduce latency and bandwidth consumption.

FIG. 5 is a diagram illustrating an example of a video encoding structure with intra-refresh cycles in an error-free link (no missing or corrupted frames are detected). As shown, the first frame 502 in the bitstream is an original I-frame that is coded into the encoded video bitstream. Intra-refresh cycles (including intra-refresh cycle 504 and intra-refresh cycle 506) can be periodically inserted into the bitstream. The intra-refresh cycle 504 distributes I-slices over four frames, including a first frame 504a, a second frame 504b, a third frame 504c, and a fourth frame 504d. The first slice (the top-most slice) of the first frame 504a includes an I-slice, while the second, third, and fourth slices of the first frame 504a include P- or B-slices. The second slice (directly below the first slice) of the second frame 504b includes an I-slice, while the first, third, and fourth slices of the second frame 504b include P- or B-slices. The third slice (directly below the second slice) of the third frame 504c includes an I-slice, while the first, second, and fourth slices of the third frame 504c include P- or B-slices. The fourth slice (the bottom-most slice) of the fourth frame 504d includes an I-slice, while the first, second, and third slices of the fourth frame 504d include P- or B-slices.

Using feedback information, the periodic insertion of intra-refresh cycles can be relaxed (or even eliminated in some cases). For instance, if each frame is divided into N slices, intra-refresh cycles can be inserted at longer periods (e.g., M frames), where each cycle covers N frames, and M>>N. In one example of feedback based intra-refresh insertion, an encoding device (e.g., at a server of a split rendering XR system) can identify a slice has missing or corrupted packets based on feedback information received from a client device. In some cases, the encoding device can generate a mask of the lost slice. The mask of the lost slice can include a location of the lost blocks in a picture. For instance, the mask can include a binary value per pixel, where the binary value is true (e.g., a value of 1) for pixels in a lost slice and false (e.g., a value of 0) for pixels that are not in a lost slice.

The server can then insert a forced intra-refresh cycle (including a period of intra-refresh slices), and in some cases a full forced I-frame, into the next available frame or frames of the bitstream. In some cases, for a forced intra-refresh cycle, the encoding device can generate a slice having a slice size that is larger than a size of the original slice of the encoded video bitstream. Generating a larger slice than that which was originally in the bitstream can ensure that any error that has propagated to other parts of a frame are compensated for as quickly as possible. For example, the slice size of a slice at location N in a frame of an intra-refresh cycle can be larger than the original slice at location N in the lost or corrupted frame, which can ensure that the full lost slice and any possible propagated motion is covered by the intra-coded blocks of the slices in the intra-refresh cycle. The decision of how many slices to divide a frame into can be a per-frame decision. In the case of enforcing an intra-refresh cycle, the encoding device can determine how long the intra-refresh cycle is going to be. For example, referring to FIG. 7A (described in more detail below), an original frame 702a has six slices. The encoding device can choose to insert an intra-refresh cycle over a certain number of frames (e.g., based on a location of a lost or corrupted slice, based on the delay between the detection of the missing or corrupted slice and the insertion of the slices of the intra-refresh cycle or I-frame, among other factors). For example, based on a decision to insert an intra-refresh cycle over three frames, the encoding device can divide the next three frames (including frames 706a, 708a, and 710a) into three slices each, and make one slice in each frame an I-slice, as shown in FIG. 7A.

As noted above, by generating a larger slice than that which was originally in the bitstream, any error that has propagated to other parts of a frame can be compensated for as quickly as possible. The propagated error can include the error that propagates to subsequent frames that are processed by the decoding device after a frame that has lost or corrupted information. In some cases, the error can propagate due to the subsequent frames that will be processed by the decoding device (as the new forced I-slices and/or I-frames are generated) being P-frames and/or B-frames that rely on inter-prediction. For example, in such cases, because a frame with lost slice is used to predict one or more subsequent frames by the decoding device, the error can propagate to future P- or B-frames.

The length (e.g., number of frames) of a forced intra-refresh cycle, the number of slices in each intra-refresh frame, the size of the slices of a forced intra-refresh cycle, and/or whether to insert a full forced I-frame, can be determined depending on various factors, as noted above. Examples of such factors include a maximum motion search range (also referred to as a motion search range), a number of slices in the frame that includes the video slice with missing packets, a location of the missing or corrupted video slice in the video frame, the time at which the forced intra-refresh cycle or I-frame can be inserted into the updated video bitstream based on the feedback information, a maximum acceptable amount of time that error concealment can be performed by the client device, any combination thereof, and/or other suitable factors. One or more of these factors can be used to determine the length of a forced intra-refresh cycle, the size of the slices of a forced intra-refresh cycle, and whether to insert a full forced I-frame. The time the forced intra-refresh cycle or I-frame is inserted can be based on the delay between the detection of the missing or corrupted slice and the insertion of the slices of the intra-refresh cycle or I-frame (e.g., based in part on how fast the encoding device can react and insert the intra-refresh cycle or I-frame). As described above, the delay can be based on the amount of time it takes to detect the missing or corrupt packets, an amount of time it takes to transmit the feedback information to the encoding device, and an amount of time the encoding device takes to perform the intra-prediction and other coding processes for the video frame 406.

The decision based on one or more of these factors can ensure the coverage of the lost slice in addition to propagated error (due to motion of the error across frames) with intra-coded blocks (of an I-frame, I-slice, or other video data) within maximum acceptable amount of time that error concealment can be performed by the client device. A larger intra-refresh cycle can avoid an instantaneous quality drop, but may require the client device to keep error concealment (e.g., ATW error concealment) running for more frames. If the encoding device determine the length of an intra-refresh cycle, or to insert a full I-frame, in order to stay within the maximum acceptable amount of time that error concealment can be performed by the client device. Such a solution can be useful in a latency-sensitive system (e.g., a system that delivers live content, such as in some split rendering XR systems, live video streaming and/or broadcasting, among others).

In one illustrative example, assuming the missing or corrupted slice spans from row X to row Y in the original frame, and the maximum motion search range is d, then intra-coded blocks (e.g., I-slices or other group of intra-coded blocks) can be added that cover from X−d to Y+d after one frame, X−2d to Y+2d after two frames, and so on. The maximum motion search range (also referred to as a motion search range) can be the maximum distance from the current block that motion estimation (inter-prediction) can use to search for similar blocks. One of ordinary skill will appreciate that intra-coded blocks can be added to the bitstream based on other multiples of the motion search range, such as X−2d to Y+2d after one frame, X−3d to Y+3d after two frames, or other multiple. In some cases, the maximum motion search range can be a parameter in the configuration of the video encoder. The maximum motion search range can be set to a default value in some cases, and/or can be provided as input by a user. In one example, depending on the factors noted above, a larger slice at location N in a frame can be generated as compared to an original slice at location N in the lost or corrupted frame. In another example, a full forced I-frame can be inserted into the encoded video bitstream depending on the various factors. Examples are described below with respect to FIG. 6A-FIG. 6D, FIG. 7A-FIG. 7F, and FIG. 8A-FIG. 8H.

FIG. 6A-FIG. 6D are diagrams illustrating examples of video coding structures using dynamic I-slices. The configurations shown in FIG. 6A-FIG. 6D are for a frame (with missing packets) that includes an original slicing structure of four slices. As shown in FIG. 6A, the original frame 602a (which is the frame that was included in the encoded video bitstream) includes a missing or corrupted slice 604a. A client device can detect the missing or corrupted slice 604a, and can send feedback information to the encoding device indicating that the frame 602a includes a lost or corrupted slice. The encoding device can begin inserting a forced intra-refresh cycle or I-frame in a next available frame 606a. The frame 606a can be a next frame immediately after the frame 602a in the encoded video bitstream, or can be a number of frames after frame 602a (based on the delay required to receive the feedback information and generate the intra-refresh period).

As noted above, various factors can be considered in determining the number of frames in a forced intra-refresh cycle, determining the number of I-slices in the forced intra-refresh cycle, determining the size of the I-slices of the forced intra-refresh cycle, and/or determining whether to insert a full forced I-frame. In some examples, factors that can be considered include a maximum motion search range, a number of slices in the frame that includes the missing or corrupted video slice, a location of the missing or corrupted video slice in the video frame, the delay between the detection of the missing or corrupted frame and the insertion of the slices of the intra-refresh cycle or I-frame, any combination thereof (including one or more of the factors), and/or other suitable factors. In FIG. 6A, the missing or corrupted slice 604a is the first slice (the top-most slice) in the original frame 602a. Based on the slice 604a being the top-most slice in the original frame 602a and there being four slices in the original frame 602a, the encoding device can insert the intra-refresh cycle over two frames, including a first intra-refresh frame 606a and a second intra-refresh frame 608a. The intra-refresh cycle includes two I-slices, including slice 605a in the first intra-refresh frame 606a and slice 607a in the second intra-refresh frame 608a. Based on the determination to include the intra-refresh cycle over two frames, each of the two frames 606a and 608a include two slices each, including an I-slice (slice 605a and slice 607a) and a P- or B-slice.

To compensate for error propagation caused by the missing or corrupted slice 604a, the slices (slice 605a and slice 607a) of the intra-refresh cycle are generated so that they are larger than the original slices that include one or more lost packets. For instance, the encoding device can generate the slice 605a for insertion in the first intra-refresh frame 606a so that the size of the slice 605a is such that the slice 605a includes a number of blocks (e.g., CTUs, CTBs, or other block) of the first intra-refresh frame 606a. In one example, the slice 605a can include the blocks in the top half of the first intra-refresh frame 606a. The other slice in the frame 606a (e.g., the blocks in the bottom half) can include a P-slice or a B-slice.

The encoding device can also generate the slice 607a for insertion in the second intra-refresh frame 608a, where the size of the slice 607a is defined to include the rest of the blocks (e.g., macroblocks, CTUs, CTBs, or other block) of the second intra-refresh frame 608a that were not covered by the slice 605a. Continuing with the example above where the slice 605a includes the blocks in the top half of the first intra-refresh frame 606a, the slice 607a can include the blocks in the bottom half of the second intra-refresh frame 608a. The other slice in the frame 608a (e.g., the blocks in the top half) can include a P-slice or a B-slice. Frames after frame 608a, including frames 610a and 612a, can include P-frames or B-frames until another missing or corrupted frame or slice is detected by the client device and an I-frame, I-slice, or intra-refresh period is inserted into the bitstream based on feedback from the client device.

In one illustrative example, the frame 602a can have a resolution of 1440×1440 (in terms of pixel width×pixel height), such that the frame 602a has 1440 rows of pixels. In such an example, the missing or corrupted slice 604a can span from a first row (the top-most row) of the frame 602a (X=1) to row 360 (Y=360), and the maximum motion search range can be equal to 32 (d=32). As noted above, for a missing or corrupted slice spanning from row X to row Y, and with a maximum motion search range of d, intra-coded blocks can be added that cover from X−d to Y+d after one frame (e.g., it takes the encoder one frame after receiving the feedback to start inserting the intra-refresh cycle, in which case there are no frames between the lost frame and the first frame of the intra-refresh cycle), X−2d to Y+2d after two frames (e.g., it takes the encoder two frames after receiving the feedback to start inserting the intra-refresh cycle, in which case there is one frame between the lost frame and the first frame of the intra-refresh cycle), and so on. Using such an example, and assuming the encoding device is able to insert the first intra-refresh frame 606a after one frame, the encoding device can generate the slice 606a to include intra-coded blocks that span from the first row to row 392 (Y+d=360+32=392). It is noted that the distance d is not subtracted from the first row (X=1) since the first row is the top row of the frame 602a. If the encoding device inserts the first intra-refresh frame 606a after two frames, the encoding device can generate the slice 606a to include intra-coded blocks that span from the first row to row 424 (Y+2d=360+64=424).

In cases when the client device receives additional inter-coded frames (e.g., P- or B-frames) before an error-free I-frame or I-slice is received, the client device can perform error concealment on the inter-coded frames until an error-free I-frame or I-slice is received. Once the intra-coded blocks of the I-frame or I-slice cover the lost slice, the client can stop performing the error concealment. For example, in FIG. 6A, the client device can stop error concealment after the first intra-refresh frame 606a, because an error free I-slice 605a is received in the first intra-refresh frame 606a.

In FIG. 6B, the original frame 602b includes a missing or corrupted slice 604b. A client device can detect the missing or corrupted slice 604b, and can send feedback information to the encoding device so that the encoding device is aware that the frame 602b includes a lost or corrupted slice. The encoding device can begin inserting a forced intra-refresh cycle or I-frame in a next available frame 606b, which can be a next frame immediately after the frame 602b in the encoded video bitstream or a number of frames after frame 602b (based on the delay required to receive the feedback information and generate the intra-refresh period). The missing or corrupted slice 604b is the second slice (the slice immediately below the top-most slice) in the original frame 602b. Because there are four slices in the original frame 602b, and because the slice 604b is not the top-most slice or the bottom-most slice in the original frame 602b, the error caused by the missing or corrupted slice 604b can propagate to the first slice and/or the third slice (from the top of the frame) of one or more subsequent frames (including frame 606b). Because error can propagate to the first slice and/or the third slice and thus can propagate to an area covered by approximately three quarters of the frame, an intra-refresh cycle cannot be inserted over two frames (two halves of I-blocks) as was done in the example of FIG. 6A. For instance, intra-refresh is a full cycle governed by the regular slicing scheme of a frame, which constrains where the dynamic I-blocks can be enforced. In such cases, the encoding device can force the frame 606b to be a full I-frame, which can ensure the propagated error is accounted for. Frames after frame 606b, including frames 608b and 610b, can include P-frames or B-frames until another missing or corrupted frame or slice is detected by the client device and an I-frame, I-slice, or intra-refresh period is inserted into the bitstream based on feedback from the client device. In the example of FIG. 6B, the client device can perform error concealment, if needed, until the I-frame 606b is received, and can stop error concealment after the frame 606b.

In one illustrative example, the frame 602b can have a resolution of 1440×1440 (with 1440 rows of pixels), the missing or corrupted slice 604b can span from row 361 of the frame 602b (X=361) to row 720 (Y=720), and the maximum motion search range can be equal to 32 (d=32). Instead of adding an I-slice in frame 606b that spans from row 329 (X−d=361−32) to 752 (Y+d=720+32) (assuming the encoding device is able to insert the frame 606b after one frame), or other size if the encoding device takes longer to insert the frame 606b, the encoding device can generate the frame 606b as a full I-frame because error can propagate to the first slice and/or the third slice, as described above. For example, as noted above, intra-refresh is a full cycle governed by the regular slicing scheme of a frame, constraining where the dynamic I-blocks can be enforced. Due to such a constraint, a slice covering three-quarters of the frame 602b cannot be inserted by the encoding device.

In FIG. 6C, the original frame 602c includes a missing or corrupted slice 604c, which can be detected by a client device. The client device can send feedback information to the encoding device to indicate that the frame 602c includes a lost or corrupted slice. The encoding device can begin inserting a forced intra-refresh cycle or I-frame in a next available frame 606c, which can be a next frame immediately after the frame 602c in the encoded video bitstream or a number of frames after frame 602c. The missing or corrupted slice 604c is the third slice (the slice immediately above the bottom-most slice) in the original frame 602c. Because there are four slices in the original frame 602c, and because the slice 604c is not the top-most slice or the bottom-most slice in the original frame 602c, the error from the missing or corrupted slice 604c can propagate to the second slice and/or the fourth slice (from the top of the frame) of one or more subsequent frames (including frame 606c). The encoding device can force the frame 606c to be a full I-frame to ensure that the propagated error is accounted for. Frames after frame 606c, including frames 608c and 610c, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-frame 606c is received, and can stop error concealment after the frame 606c.

In one illustrative example, the frame 602c can have a resolution of 1440×1440 (with 1440 rows of pixels), the missing or corrupted slice 604c can span from row 721 of the frame 602c (X=721) to row 1080 (Y=1080), and the maximum motion search range can be equal to 32 (d=32). Similar to the example above with respect to FIG. 6B, instead of adding an I-slice in frame 606c that spans from row 689 (X−d=721−32) to 1112 (Y+d=1080+32) (assuming the encoding device is able to insert the frame 606c after one frame), or other size if the encoding device takes longer to insert the frame 606c, the encoding device can generate the frame 606c as a full I-frame.

In FIG. 6D, the original frame 602d includes a missing or corrupted slice 604d. A client device can detect the missing or corrupted slice 604d, and can send feedback information to the encoding device so the encoding device is aware that the frame 602a includes a lost or corrupted slice. The encoding device can begin inserting a forced intra-refresh cycle or I-frame in a next available frame 606d. The frame 606d can be a next frame immediately after the frame 602d, or can be a number of frames after frame 602d based on the delay required to receive the feedback information and generate the intra-refresh period.

The slices (slice 605d and slice 607d) of the intra-refresh cycle in FIG. 6D are generated so that they are larger than the original slices in the frame 602d, in order to compensate for propagated (due to motion of the error across frames) error. In FIG. 6D, the missing or corrupted slice 604d is the fourth slice (the bottom-most slice) in the original frame 602d. Because the slice 604d is the bottom-most slice in the original frame 602d, the encoding device can insert the intra-refresh cycle over two frames (including a first intra-refresh frame 606d and a second intra-refresh frame 608d), in which case each of the two frames 606d and 608d include two slices each, including an I-slice (slice 605d and slice 607d) and a P- or B-slice. To account for the propagated error, the encoding device can generate the slice 605d for the first intra-refresh frame 606d with a size that includes a number of blocks (e.g., macroblocks, CTUs, CTBs, or other block) of the first intra-refresh frame 606d. In one example, the slice 605d can include the blocks in the top half of the first intra-refresh frame 606d. The other slice in the frame 606d (e.g., the blocks in the bottom half) can include a P-slice or a B-slice.

The encoding device can generate the slice 607d for insertion in the second intra-refresh frame 608d. The size of the slice 607d can be defined to include the rest of the blocks (e.g., macroblocks, CTUs, CTBs, or other block) of the second intra-refresh frame 608d that were not covered by the slice 605d. Continuing with the example above with the slice 605d including the blocks in the top half of the first intra-refresh frame 606d, the slice 607d can include the blocks in the bottom half of the second intra-refresh frame 608d. The other slice in the frame 608d (e.g., the blocks in the top half) can include a P-slice or a B-slice. Frames after frame 608d, including frames 610d and 612d, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-slice 607d is received, and can stop error concealment after the frame 608d, which is the point at which the intra-coded blocks cover the lost slice 604d.

In one illustrative example, the frame 602d can have a resolution of 1440×1440. In such an example, the missing or corrupted slice 604d can span from a row 1081 of the frame 602a (X=1081) to a bottom row 1440 (Y=1440), and the maximum motion search range can be equal to 32 (d=32). In one example, assuming the encoding device is able to insert the first intra-refresh frame 606d after one frame, the encoding device can generate the slice 606d to include intra-coded blocks that span from row 1049 (X−d=1081−32=1049) to 1440. It is noted that the distance d is not added to the last row (Y=1440) of the frame 602d. If the encoding device inserts the first intra-refresh frame 606d after two frames, the encoding device can generate the slice 606d to include intra-coded blocks that span from row 1049 (X−d 1081−64=1017) to 1440.

FIG. 7A-FIG. 7F are diagrams illustrating additional examples of video coding structures using dynamic I-slices. The configurations shown in FIG. 7A-FIG. 7F are for a missing or corrupted frame that includes an original slicing structure of six slices. In FIG. 7A, the original frame 702a that was included in the encoded video bitstream includes a missing or corrupted slice 704a. A client device can detect the missing or corrupted slice 704a, and can send feedback information to the encoding device indicating that the frame 702a includes a lost or corrupted slice. The encoding device can begin inserting a forced intra-refresh cycle or I-frame in a next available frame 706a, which can be a next frame immediately after the frame 702a in the encoded video bitstream or can be a number of frames after frame 702a (based on the delay required to receive the feedback information and generate the intra-refresh period).

Because the missing or corrupted slice 704a is the first slice (the top-most slice) in the original frame 702a and based on there being six slices in the original frame 702a, the encoding device can insert the intra-refresh cycle over three frames, including a first intra-refresh frame 706a, a second intra-refresh frame 708a, and a third intra-refresh frame 710a. Based on the determination to include the intra-refresh cycle over three frames, each of the three frames 706a, 708a, and 710a include three slices each, including an I-slice (slice 705a, slice 707a, and slice 709a) and P- or B-slices. For example, the intra-refresh cycle includes three slices, including slice 705a, slice 707a, and slice 709a. To account for error propagation caused by the missing or corrupted slice 704a, the slices (slice 705a, slice 707a, and slice 709a) of the intra-refresh cycle are larger than the original slices that include one or more lost packets in order to cover the propagated motion. For instance, the encoding device can generate the slice 705a for insertion in the first intra-refresh frame 706a so that the size of the slice 705a is such that the slice 705a includes a first number of blocks (e.g., macroblocks, CTUs, CTBs, or other block) of the first intra-refresh frame 706a, such as the blocks in the top third of the first intra-refresh frame 706a. The remaining two slices in the frame 706a (e.g., the blocks in the bottom two-thirds of the frame 706a) can include P-slices or B-slices.

The encoding device can generate the slice 707a for insertion in the second intra-refresh frame 708a with a size defined to include a second number of blocks (e.g., macroblocks, CTUs, CTBs, or other block) of the second intra-refresh frame 708a, such as the middle third of the second intra-refresh frame 708a. The remaining two slices in the second intra-refresh frame 708a (e.g., the blocks in the top third and bottom third) can include P-slices or B-slices. The encoding device can further generate the slice 709a for insertion in the third intra-refresh frame 710a, where the size of the slice 709a is defined to include the rest of the blocks (e.g., macroblocks, CTUs, CTBs, or other block) of the third intra-refresh frame 710a that were not covered by the slice 705a and the slice 707a. Continuing with the examples above where the slice 705a includes the blocks in the top third of the first intra-refresh frame 706a and the slice 707a includes the blocks in the middle third of the second intra-refresh frame 708a, the slice 709a can include the blocks in the bottom third of the third intra-refresh frame 710a. The remaining two slices in the third intra-refresh frame 710a (e.g., the blocks in the top two-thirds) can include P-slices or B-slices. Frames after frame 710a, including frames 712a and 714a, can include P-frames or B-frames until another missing or corrupted frame or slice is detected by the client device and an I-frame, I-slice, or intra-refresh period is inserted into the bitstream based on feedback from the client device. In the example of FIG. 7A, the client device can perform error concealment, if needed, until the I-slice 705a is received, and can stop error concealment after the frame 706a.

In one illustrative example, the frame 702a can have a resolution of 1440×1440 (with 1440 rows of pixels). The missing or corrupted slice 704a can span from a first row (the top-most row) of the frame 702a (X=1) to row 240 (Y=240), and the maximum motion search range can be equal to 32 (d=32). Assuming the encoding device is able to insert the first intra-refresh frame 706a after one frame, the encoding device can generate the slice 706a to include intra-coded blocks that span from the first row to row 272 (Y+d=240+32). The distance d is not subtracted from the first row (X=1) since the first row is the top row of the frame 702a. If the encoding device inserts the first intra-refresh frame 706a after two frames, the encoding device can generate the slice 706a to include intra-coded blocks that span from the first row to row 304 (Y+2d=240+64).

Referring to FIG. 7B, the original frame 702b includes a missing or corrupted slice 704b. Based on feedback received from a client device indicating the frame 702b includes a lost or corrupted slice, the encoding device can begin inserting a forced intra-refresh cycle or I-frame in a next available frame 706b (e.g., a next frame immediately after the frame 702b in the encoded video bitstream or a number of frames after frame 702b). Because the missing or corrupted slice 704b is the second slice (the slice immediately below the top-most slice) in the original frame 702b and based on there being six slices in the original frame 702b, the encoding device can insert the intra-refresh cycle over two frames, including a first intra-refresh frame 706b (with slice 705b) and a second intra-refresh frame 708b (with slice 707b). Based on the intra-refresh cycle being spanned over two frames, the first intra-refresh frame 706b and the second intra-refresh frame 708b include two slices each, including an I-slice (slice 705b and slice 707b) and a P- or B-slice.

To account for error propagation caused by the missing or corrupted slice 704b, the encoding device can generate the slice 705b so that it includes a first number of blocks of the first intra-refresh frame 706b (e.g., the blocks in the top half of the first intra-refresh frame 706b). The other slice in the frame 706b (e.g., the blocks in the bottom half of the frame 706b) can include a P-slice or a B-slice. The encoding device can generate the slice 707b for insertion in the second intra-refresh frame 708b with a size defined to include a second number of blocks of the second intra-refresh frame 708b (e.g., the blocks in the bottom half of the second intra-refresh frame 708b). The other slice in the second intra-refresh frame 708b (e.g., the blocks in the top half) can include a P-slice or a B-slice. Frames after frame 708b, including frames 710b and 712b, can include P-frames or B-frames until another missing or corrupted frame or slice is detected by the client device and an I-frame, I-slice, or intra-refresh period is inserted into the bitstream based on feedback from the client device. In the example of FIG. 7B, the client device can perform error concealment, if needed, until the I-slice 705b is received, and can stop error concealment after the frame 706b.

In one illustrative example, the frame 702b can have a resolution of 1440×1440. The missing or corrupted slice 704b can span from a row 241 of the frame 702b (X=241) to row 480 (Y=480), and the maximum motion search range can be equal to 32 (d=32). Assuming the encoding device is able to insert the first intra-refresh frame 706b after one frame, the encoding device can generate the slice 706b to include intra-coded blocks that span from row 209 (X−d=241-32) to row 512 (Y+d=480+32).

In FIG. 7C, the original frame 702c includes a missing or corrupted slice 704c. Based on received feedback indicating the frame 702c includes a lost or corrupted slice, the encoding device can begin inserting a forced intra-refresh cycle or I-frame in a next available frame 706c. Because there are six slices in the original frame 702c, and because the slice 704c is not one of the two top-most slices or one of the two bottom-most slices in the original frame 702c, the error from the missing or corrupted slice 704c can propagate to the entire portion of one or more subsequent frames (including frame 706c). In such cases, the encoding device can force the frame 706c to be a full I-frame to ensure the propagated error is accounted for. Frames after frame 706c, including frames 708c and 710c, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-frame 706c is received, and can stop error concealment after the frame 706c.

In one illustrative example, the frame 702c can have a resolution of 1440×1440, the missing or corrupted slice 704c can span from row 481 of the frame 702c (X=481) to row 720 (Y=720), and the maximum motion search range can be equal to 32 (d=32). Instead of adding an I-slice in frame 706c that spans from row 449 (X−d=481-32) to 752 (Y+d=720+32) (assuming the encoding device is able to insert the frame 706c after one frame), or other size if the encoding device takes longer to insert the frame 706c, the encoding device can generate the frame 706c as a full I-frame.

In FIG. 7D, the original frame 702d includes a missing or corrupted slice 704d. Based on feedback received from a client device indicating the frame 702d includes a lost or corrupted slice, the encoding device can begin inserting a forced intra-refresh cycle or I-frame in a next available frame 706d. Because there are six slices in the original frame 702d and the slice 704d is not one of the two top-most slices or one of the two bottom-most slices in the original frame 702d, the encoding device can force the frame 706d to be a full I-frame to ensure the error that may propagate to one or more subsequent frames is accounted for. Frames after frame 706d, including frames 708d and 710d, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-frame 706d is received, and can stop error concealment after the frame 706d.

In one illustrative example, the frame 702d can have a resolution of 1440×1440 (with 1440 rows of pixels), the missing or corrupted slice 704d can span from row 721 of the frame 702d (X=721) to row 960 (Y=960), and the maximum motion search range can be equal to 32 (d=32). Similar to the example discussed with respect to FIG. 7C, the encoding device can generate the frame 706d as a full I-frame, instead of adding an I-slice that spans a subset of the rows in the frame 706d.

Referring to FIG. 7E, the original frame 702e includes a missing or corrupted slice 704e. Based on received feedback information indicating the frame 702e includes a lost or corrupted slice, the encoding device can begin inserting a forced intra-refresh cycle or I-frame in a next available frame 706e (e.g., a next frame immediately after the frame 702e in the encoded video bitstream or a number of frames after frame 702e). Because the missing or corrupted slice 704e is the fifth slice (the slice immediately above the bottom-most slice) in the original frame 702e and based on there being six slices in the original frame 702e, the encoding device can insert the intra-refresh cycle over two frames, including a first intra-refresh frame 706e (with slice 705e) and a second intra-refresh frame 708e (with slice 707e).

To account for error propagation caused by the missing or corrupted slice 704b, the encoding device can generate the slice 705e so that it includes a first number of blocks of the first intra-refresh frame 706e (e.g., the blocks in the top half of the first intra-refresh frame 706e). The other slice in the frame 706e (e.g., the blocks in the bottom half of the frame 706e) can include a P-slice or a B-slice. The encoding device can generate the slice 707e with a size defined to include a second number of blocks of the second intra-refresh frame 708e (e.g., the blocks in the bottom half of the second intra-refresh frame 708e). The other slice in the second intra-refresh frame 608e (e.g., the blocks in the top half) can include a P-slice or a B-slice. Frames after frame 708e, including frames 710e and 712e, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-slice 705e is received, and can stop error concealment after the frame 706e.

In one illustrative example, the frame 702e can have a resolution of 1440×1440. The missing or corrupted slice 704e can span from a row 961 of the frame 702e (X=961) to row 1200 (Y=1200), and the maximum motion search range can be equal to 32 (d=32). Assuming the encoding device is able to insert the first intra-refresh frame 706e after one frame, the encoding device can generate the slice 706e to include intra-coded blocks that span from row 929 (X−d=961-32) to row 1232 (Y+d=1200+32).

In FIG. 7F, the original frame 702f includes a missing or corrupted slice 704f. Based on received feedback information indicating the frame 702f includes a lost or corrupted slice, the encoding device can begin inserting a forced intra-refresh cycle or I-frame in a next available frame 706f. Because the missing or corrupted slice 704a is the sixth slice (the bottom-most slice) in the original frame 702f and based on there being six slices in the original frame 702f, the encoding device can insert the intra-refresh cycle over three frames, including a first intra-refresh frame 706f (including slice 705f), a second intra-refresh frame 708f (including slice 707f), and a third intra-refresh frame 710f (including slice 7090. Because the intra-refresh cycle is spanned over three frames, the frames 706f, 708f, and 710f each have three slices each, including an I-slice (slice 705f, slice 707f, and slice 7090 and a P- or B-slice. To account for error propagation caused by the missing or corrupted slice 704f, the encoding device can generate the slice 705f for insertion in the first intra-refresh frame 706f so that the size of the slice 705f includes a first number of blocks of the first intra-refresh frame 706f (e.g., the blocks in the top third of the first intra-refresh frame 7060. The remaining two slices in the frame 706f (e.g., the blocks in the bottom two-thirds of the frame 7060 can include P-slices or B-slices.

The encoding device can generate the slice 707f for insertion in the second intra-refresh frame 708a with a size defined to include a second number of blocks of the second intra-refresh frame 708f (e.g., the blocks in the middle third of the second intra-refresh frame 7080. The remaining two slices in the second intra-refresh frame 708f (e.g., the blocks in the top third and bottom third) can include P-slices or B-slices. The encoding device can further generate the slice 709f for insertion in the third intra-refresh frame 710f, where the size of the slice 709f is defined to include the rest of the blocks of the third intra-refresh frame 710f that were not covered by the slice 705f and the slice 707f. Continuing with the examples above, the slice 709f can include the blocks in the bottom third of the third intra-refresh frame 710f. The other two slices in the third intra-refresh frame 710f (e.g., the blocks in the top two-thirds) can include P-slices or B-slices. Frames after frame 710f, including frames 712f and 714f, can include P-frames or B-frames until another missing or corrupted frame or slice is detected by the client device and an I-frame, I-slice, or intra-refresh period is inserted into the bitstream based on feedback from the client device. The client device can perform error concealment, if needed, until the I-slice 709f is received, which is when the intra-coded blocks cover the lost slice 704f slice. The client device can stop error concealment after the frame 706f.

In one illustrative example, the frame 702f can have a resolution of 1440×1440 (with 1440 rows of pixels). The missing or corrupted slice 704f can span from a first row (the top-most row) of the frame 702a (X=1) to row 240 (Y=240), and the maximum motion search range can be equal to 32 (d=32). Assuming the encoding device is able to insert the first intra-refresh frame 706f after one frame, the encoding device can generate the slice 706f to include intra-coded blocks that span from the first row to row 272 (Y+d=240+32). The distance d is not added to the last row (Y=1440) of the frame 702f.

FIG. 8A-FIG. 8H are diagrams illustrating additional examples of video coding structures using dynamic I-slices. The configurations shown in FIG. 8A-FIG. 8H are for a missing or corrupted frame that includes an original slicing structure of eight slices. The frames in FIG. 8A-FIG. 8H can have a resolution of 1440×1440 (with 1440 rows of pixels), and the maximum motion search range can be equal to 32 (d=32). Similar to the examples described above with respect to FIG. 6A-FIG. 6D and FIG. 7A-FIG. 7F, the number of frames in a forced intra-refresh cycle, the number of slices in each intra-refresh frame, the size of the I-slices in the intra-refresh frames of the forced intra-refresh cycle, and whether to insert a full forced I-frame can be determined using one or more of the various factors described above. For example, in FIG. 8A, the encoding device can insert the intra-refresh cycle over four frames (including a first intra-refresh frame 806a and a second intra-refresh frame 808a, where the third and fourth intra-refresh frames are not shown in FIG. 8A) based on the missing or corrupted slice being the first slice (the top-most slice) in the original frame 802a and the fact that there are eight slices in the original frame. In such an example when the intra-refresh cycle is spanned over four frames, the intra-refresh frames 806a and 808a will each include four slices, including an I-slice (e.g., slice 805a and slice 807a) and P- or B-slices. In one illustrative example, in FIG. 8A, the missing or corrupted slice can span from a first row (X=1) to row 180 (Y=180) in the original frame 802a. Using the X−d to Y+d (after one frame), X−2d to Y+2d (after two frames), etc. formulation from above, the missing or corrupted slice covers from row 1 to row 180 in the original frame 802a, and error can propagate to row 212 (180+32=212). The I-slice 805a can be generated so that the intra-blocks of the I-slice 805a span from row 1 to row 360 in the first intra-refresh frame 806a in order to ensure that the error (from row 1 to row 212) is cleared. The I-slice 807a can be generated so that the intra-blocks of the I-slice 807a span from row 361 to row 720 in the second intra-refresh frame 808a.

A similar configuration is shown in FIG. 8H, where an encoding device can insert an intra-refresh cycle over four frames based on a missing or corrupted slice being the last slice (the bottom-most slice) in the original frame. For example, the missing or corrupted slice can span from row 1261 (X=1261) to row 1440 (Y=1440) in the original frame, and the I-slices in the four intra-refresh frames can be generated so that the intra-blocks of the I-slices span 360 rows each (to cover the full 1440 rows of the original frame).

Referring to FIG. 8B, the encoding device can insert the intra-refresh cycle over three frames (only the first intra-refresh frame 806b and the second intra-refresh frame 808b are shown in FIG. 8B) based on the missing or corrupted slice 804b being the second slice (the slice immediately below the top-most slice) in the original frame 802b and the fact that there are eight slices in the original frame. In one illustrative example, in FIG. 8B, the missing or corrupted slice 804b can span from row 181 (X=181) to row 360 (Y=360) in the original frame 802b, and the I-slice 805b in the first intra-refresh frame 806b can be generated so that the intra-blocks of the I-slice 805b span from row 1 to 480 in the first intra-refresh frame 806b. The I-slice 807b in the second intra-refresh frame 808b can be generated so that the intra-blocks of the I-slice 807b span from row 481 to row 960 in the second intra-refresh frame 808b. An I-slice in a third intra-refresh frame (not shown) can be generated so that the intra-blocks of the I-slice span from row 961 to row 1440 in the third intra-refresh frame. A similar configuration is shown in FIG. 8G, where an encoding device can insert an intra-refresh cycle over three frames based on a missing or corrupted slice being the seventh slice (the slice immediately above the bottom-most slice) in the original frame. For example, the missing or corrupted slice can span from row 1081 (X=1081) to row 1260 (Y=1260) in the original frame, and the I-slices in the three intra-refresh frames can be generated so that the intra-blocks of the I-slices span 480 rows each (to cover the full 1440 rows of the original frame).

In FIG. 8C, the encoding device can insert the intra-refresh cycle over two frames (including a first intra-refresh frame 806c and a second intra-refresh frame 808c) based on the missing or corrupted slice 804c being the third slice (the slice immediately below the two top-most slice) in the original frame 802c and the fact that there are eight slices in the original frame. In one illustrative example, in FIG. 8C, the missing or corrupted slice 804c can span from row 361 (X=361) to row 540 (Y=540) in the original frame 802c. The I-slice 805c in the first intra-refresh frame 806c can be generated so that the intra-blocks of the I-slice 805c span the top half (from row 1 to row 720) of the first intra-refresh frame 806c. The I-slice 807c in the second intra-refresh frame 808c can be generated so that the intra-blocks of the I-slice 807c span the bottom half (from row 721 to row 1440) of the second intra-refresh frame 808c. A similar configuration is shown in FIG. 8F, where an encoding device can insert an intra-refresh cycle over two frames based on a missing or corrupted slice being the sixth slice (the slice immediately above the two bottom-most slices) in the original frame. For example, the missing or corrupted slice can span from row 901 (X=901) to row 1080 (Y=1080) in the original frame, and the I-slices in the three intra-refresh frames can be generated so that the intra-blocks of the I-slices span 720 rows each (to cover the full 1440 rows of the original frame).

In FIG. 8D, the encoding device can insert a full I-frame 806d based on the missing or corrupted slice 804d being the fourth slice (the slice immediately below the three top-most slices) in the original frame 802d and the fact that there are eight slices in the original frame. For example, because the missing or corrupted slice 804d is in the middle of the frame 802d, the motion compensation error caused by the missing or corrupted slice 804d can propagate to the entire portion of one or more subsequent frames. In one illustrative example, referring to FIG. 8D, the missing or corrupted slice 804d can span from row 541 (X=541) to row 720 (Y=720) in the original frame 802d. The I-frame 806d can be generated so that the intra-blocks of the I-frame 806d span the entire frame (from row 1 to row 1440). A similar configuration is shown in FIG. 8E, where a full I-frame is generated based on a missing or corrupted slice being the fifth slice (the slice immediately above the three bottom-most slices) in the original frame. For example, the missing or corrupted slice can span from row 721 (X=721) to row 900 (Y=900) in the original frame, and the I-frame can be generated so that the intra-blocks of the I-frame span the entire frame (from row 1 to row 1440).

As noted above, any one or more of the various factors (in any combination) described above can be used to determine the number of frames in a forced intra-refresh cycle, the number of slices in each intra-refresh frame, the size of the I-slices in the intra-refresh frames of the forced intra-refresh cycle, and/or whether to insert a full forced I-frame. In one example, if an error occurs in the first slice of the video frame, regardless of the number of slices in the video frame in which the corrupted or missing data occurred, an intra-refresh cycle can be used to provide a full I-frame over a number of succeeding intra-refresh cycle frames. In another example, if a missing or corrupt slice is not the first slice of the video frame, a full forced I-frame can be added to the bitstream. In such examples, the number of slices in the video frame is not a factor in determining the characteristics of the intra-coded data that is to be inserted into the bitstream.

Another technique that can be performed in response to receiving feedback information is to dynamically insert individual I-slices into video frames. For example, if allowed by the encoding device, the encoding device can insert individual I-slices in portions of the bitstream that are affected by error. Such a technique can assume that an encoder can enforce a certain slice to be an intra-coded slice. As noted before, the error in a given frame can be due to a missing or corrupted slice, and in some cases can also include propagated prediction error due to the missing or corrupted slice. Propagated motion depends on a motion search range (where maximum search range is d, as noted above), and when the encoding device obtains the feedback information indicating the missing or corrupted slice and when the encoding device starts inserting the I-slices. Inserting individual I-slices does not change the slicing structure of the video frames, and can work on top of any encoding configuration (e.g., strict CBR or cyclic intra-refresh). In some cases, the encoding device can decide to insert the needed I-slices over multiple frames in order not to introduce an instantaneous drop in quality. For example, if an encoding device inserts a full I-frame in a bitstream, it will introduce a bitrate spike to maintain the quality of the video, which increases the amount of transmitted video data and can lead to delays in receiving the video data. In another example, the encoding device can insert a low quality I-frame (e.g., at a smaller frame size) to avoid the bitrate spike, which decreases the quality of the video. Both of these inefficiencies can be addressed by inserting the I-slices over multiple frames. When inserting the I-slices over multiple frames, the encoding device can take into account the need to cover propagated error (e.g., by increasing the size of the I-slices). As noted before, the client device can perform error concealment (e.g., ATW error concealment) until lost slices with propagated errors are cleared.

Figure 9A:
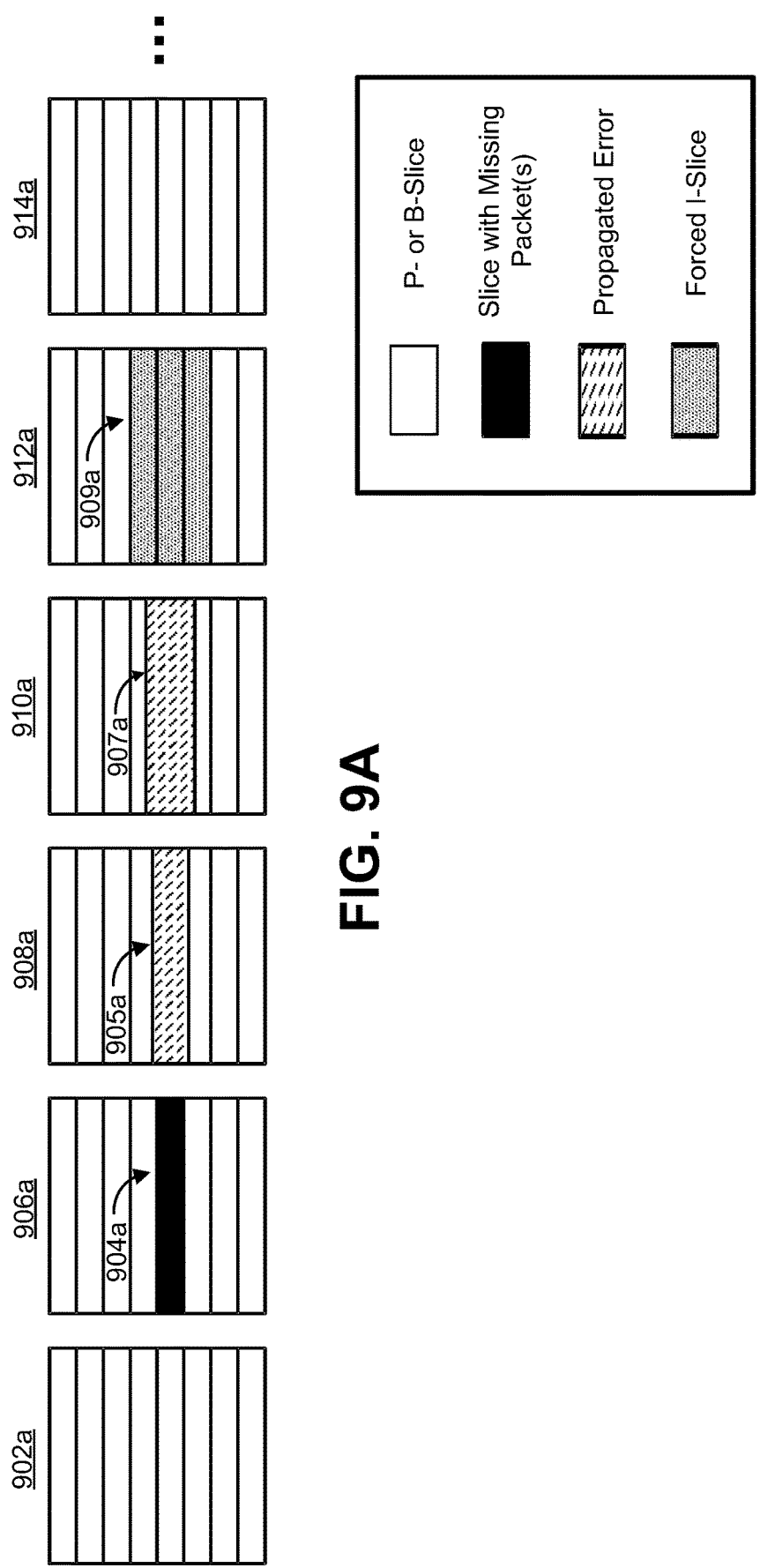
FIG. 9A and FIG. 9B are diagrams illustrating an examples of video coding structures using dynamic individual I-slices, in accordance with some examples.
Figure 9B:
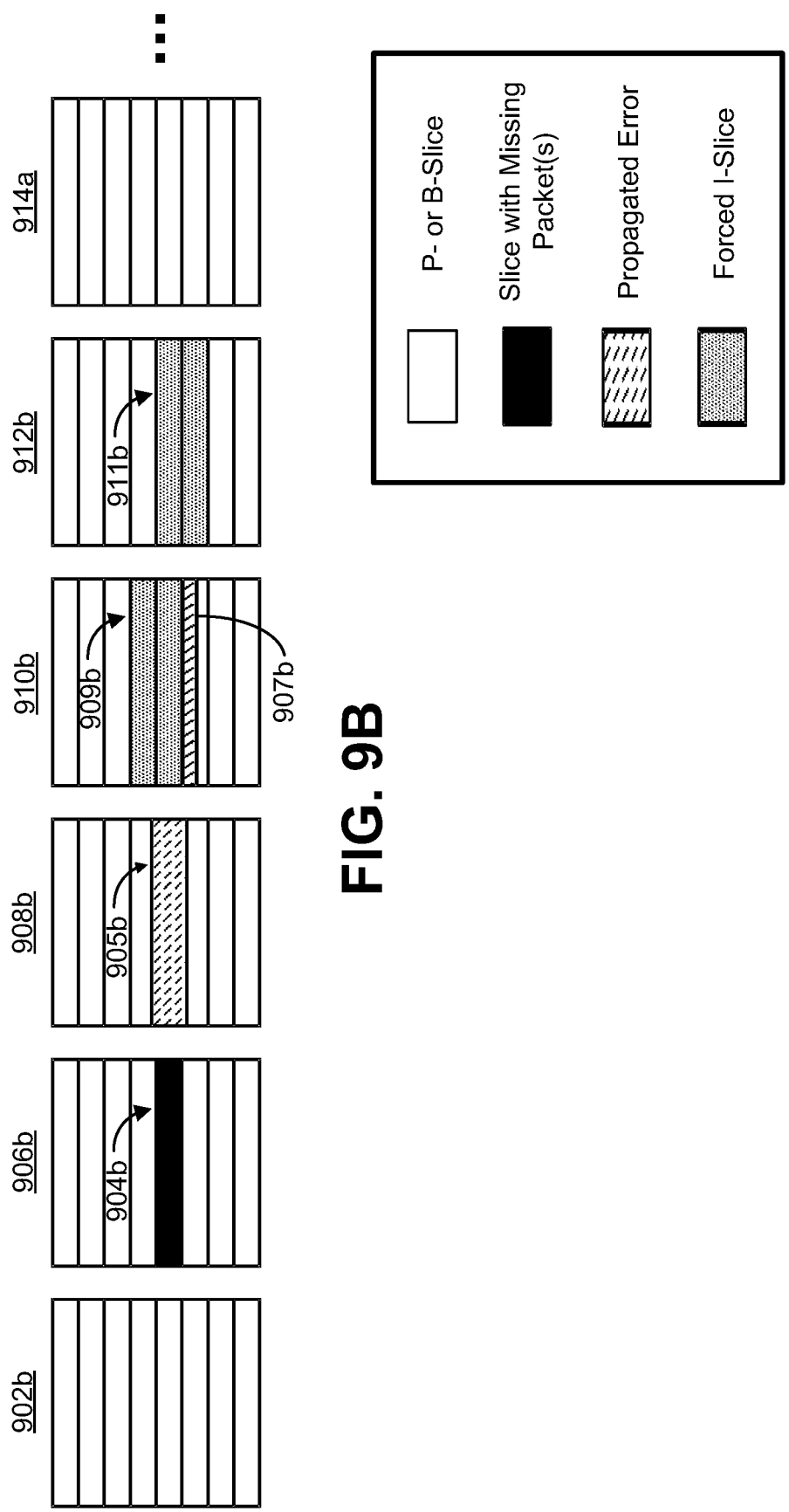

FIG. 9A and FIG. 9B are diagrams illustrating an examples of video coding structures using dynamic individual I-slices. In FIG. 9A, a frame 902a in a video bitstream includes P-slices and/or B-slices. In a frame 906a, a slice 904a with missing packets is detected by a client device. The client device can send feedback information to the encoding device indicating that the frame 906a includes a corrupted slice. Based on the delay between when the corrupted slice 904a is detected and when the encoding device can begin inserting a forced I-slice into the bitstream, the encoding device starts inserting I-slices 909a at frame 912a.

Because there is a two frame delay from when the corrupted slice 904a is detected to when the encoding device inserts the I-slices 909a, the client device continues to receive frames (including a frame 908a and a frame 910a) with P-slices and/or B-slices. The prediction error caused by the corrupted slice 904a propagates into subsequent frames, including frames 908a and 910a. Any area of a video frame that can be predicted from corrupted slice 904a may have corrupted video data (e.g., video coding artifacts) based on the corrupted packet data in the corrupted slice 904a. As shown, the frame 908a includes propagated error 905a, and the frame 910a includes propagated error 907a. For example, the propagated error 905a is caused by the decoding device of the client using the corrupted slice 904a (which includes missing packets) for prediction. Similarly, the propagated error 907a is caused by the decoding device of the client using the corrupted slice 904a and/or other corrupted slices (which may be caused by use of the corrupted lice 904a) for prediction.

As noted above, the encoding device starts inserting I-slices 909a at frame 912a. As shown in the example of FIG. 9A, the encoding device decides to clear all propagated errors with I-slices in one frame (instead of spreading the I-slices over multiple frames). Such a solution can prevent error from further propagating to subsequent frames, and can limit the number of I-slices needed to stop the error propagation. While the I-slices 909a are shown to include three I-slices in FIG. 9A, a single I-slice can be inserted in the frame 912a (or other frame) to cover the prediction error.

Referring to FIG. 9B, a frame 902b in a video bitstream includes P-slices and/or B-slices. In a frame 906b, a slice 904b with missing packets is detected by a client device. The client device can send feedback information to the encoding device indicating that the frame 906b includes a corrupted slice. Based on the delay between when the corrupted slice 904b is detected and when the encoding device can begin inserting a forced I-slice into the bitstream, the encoding device starts inserting I-slices 909b at frame 910b.

Because there is a one frame delay from when the corrupted slice 904b is detected to when the encoding device inserts the I-slices 907b, the client device receive the frame 908b with P-slices and/or B-slices. The prediction error caused by the missing or corrupted slice 904b propagates into subsequent frames, including frames 908b and 910b. As shown, the frame 908b includes propagated error 905b. Because the I-slices 909b include only two slices, the frame 910b includes residual propagated error 911b. The propagated error 905b is caused by the decoding device of the client using the slice 904b for prediction, and the propagated error 907b is caused by the use of the slice 904b and/or other corrupted slices (caused by use of the slice 904b) for prediction.

The encoding device starts inserting I-slices 909b at frame 910b. As shown in FIG. 9B, the encoding device decides to clear all propagated errors with I-slices over two frames, leading to residual propagation error 911b. The I-slices 911b in frame 912b include two slices to compensate for the residual propagation error 911b. As compared to the example from FIG. 9A, an additional I-slice is needed (as shown by the I-slices 911b in frame 912b including two slices) to stop the error propagation. Inserting the I-slices 909b and 911b over multiple frames can prevent the introduction of an instantaneous drop in quality in the encoded video bitstream (e.g., based on a bitrate spike that may be caused by insertion of an entire I-frame).

In some examples, a more advanced scheme (e.g., a scheme that is standard compliant) may change the slice structure every frame or at a certain number of frames. For instance, when an encoding device decides to use I-slices, if it has sufficient information, it can define an I-slice that has an optimal size to cover error propagation, based on the encoding device's knowledge of error propagation. For example, an area of a frame that is impacted by error propagation can be defined as a slice, and intra-blocks can be generated for the slice that covers the defined area. The area of the frame that is not impacted by error propagation can be encoded as one or more P-slices or B-slices.

In some examples, an encoding device can analyze a history of motion vectors of past frames. Motion vectors corresponding to areas impacted by propagated error are not used for inter-prediction (e.g., the areas that are impacted by propagated error are not used as reference for subsequent frames). For example, the encoding device can buffer motion vectors of a past M number of frames (e.g., motion vectors of the last 2-3 frames) and possible error propagation from frame n−1, from frame n−2, etc. (where n is a current frame that is currently being processed) given an error in a previous frame. In one example, the motion vectors from error that occurred in a frame n−2 can be tracked, and the possible locations of the errors can be marked in a frame n−1. These possible locations of errors can be avoided (not used for reference). In such an example, when choosing motion vectors for the current frame n, reference blocks in frame n−1 with propagated error are avoided and are not used for inter-prediction. In some cases, when no match in the search region is free of error, the current block (e.g., macroblock, CTU, CTB, CU, CB, or other block) to be coded in frame n is encoded as an intra-coded block even within a P-slice. An error-free area of a frame can occur when error from one or more prior frames n−1, n−2, etc. did not propagate to this error-free area.

In some examples, an encoding device can implement a forward error mitigation technique. For example, the future slice structure can be made dynamic based on recent errors. If the recent packets have seen a lot of losses, the encoding device can reduce the period of inserting I-frames or the intra-refresh cycle size. More frequent I-frames require more bitrate to achieve the same quality, are harder to maintain low peak-to-average frame size ratio, and provide more robustness to packet loss. A compromise can be achieved as a function of recent packet loss history.

Examples of processes performed using the dynamic I-frame or I-slice insertion techniques described herein will now be described. FIG. 13 is a flowchart illustrating an example of a process 1300 for processing video data. At block 1302, the process 1300 includes determining, by a computing device (e.g., decoding device 112 of FIG. 1), at least a portion of a video slice of a video frame in a video bitstream is missing or corrupted. In one example, the computing device can parse packet packets headers of packets of the video slice to determine whether any of the packets are missing or corrupted. A packet header of a packet can indicate which slice that packet belongs and can also indicate the first and last blocks covered by that packet or slice. In other examples, the computing device can refer to other information-carrying portions of the video data, such as a slice header, a parameter set (e.g., a picture parameter set (PPS), or other parameter set), an supplemental enhancement information (SEI) message, and/or other information.

At block 1304, the process 1300 includes sending feedback information to an encoding device. The feedback information indicates at least the portion of the video slice is missing or corrupted. For example, the feedback information can include information indicating that the video slice has one or more missing packets. In some examples, the information can include an indication of the picture that includes the missing or corrupted slice, and one or more slices that include the missing packets.

At block 1306, the process 1300 includes receiving an updated video bitstream from the encoding device in response to the feedback information. The updated video bitstream includes at least one intra-coded video slice having a size that is larger than the missing or corrupted video slice. The updated video bitstream can include a subsequent portion of the video bitstream, and the at least one intra-coded video slice is included in a later frame in the video bitstream than the video frame including the slice with the missing or corrupted information (e.g., packets). For example, the at least one intra-coded slice in the updated video bitstream can have a higher picture order count (POC), output order, and/or decoding order than the POC, output order, and/or decoding order of the video frame including the slice with missing or corrupted information (e.g., packets) in the video bitstream. In one illustrative example, referring to FIG. 6A, the frame 602a of a video bitstream includes a missing or corrupted slice 604a, and, in response to feedback information, the video bitstream can be updated to include a forced intra-coded slice 605a in a next available frame 606a (e.g., which can be a next frame immediately after the frame 602a in the encoded video bitstream, or can be a number of frames after frame 602a).

The size of the at least one intra-coded video slice is determined to cover (or compensate for) the missing or corrupted slice and propagated error in the video frame caused by the missing or corrupted slice. The propagated error in the video frame can be caused by the missing or corrupted slice based on a motion search range. For example, as noted above, any area of a video frame that can be predicted using data from a missing or corrupted slice may have corrupted video data. In some examples, the missing or corrupted slice spans from a first row to a second row in the video frame, and the size of the at least one intra-coded video slice is defined to include, at least, the first row minus the motion search range to the second row plus the motion search range. In some cases, the at least one intra-coded video slice can be larger than the first row minus the motion search range to the second row plus the motion search range. For example, referring to the example from above with respect to FIG. 8A, using the X−d to Y+d (after one frame), X−2d to Y+2d (after two frames), etc. formulation, a missing or corrupted slice can span from row 1 to row 180 in the original frame 802a, and the error can propagate to row 212 (180+32=212). An intra-coded video slice (e.g., I-slice 805a) can be generated so that the intra-blocks of the intra-coded video slice span from row 1 to row 360 in an intra-refresh frame (e.g., intra-refresh frame 806a), which can ensure that the error (from row 1 to row 212) is cleared. One of ordinary skill will appreciate that intra-coded blocks can be added to the bitstream using other multiples of the motion search range, such as X−2d to Y+2d after one frame, X−3d to Y+3d after two frames, or any other multiple that can be used to cover (e.g., remove) the propagated error.

In some examples, in response to determining at least the portion of the video slice is missing or corrupted, the computing device can perform error concealment (e.g., asynchronous time warping (ATW) error concealment or other type of error concealment) on one or more video frames until an error-free intra-coded video slice is received in the updated video bitstream. For example, it can take an amount of time between when the computing device detects the missing or corrupted slice, and when the computing device receives the intra-coded video slice. The computing device can perform the error concealment for any frames that are received prior to receiving the intra-coded video slice.

In some implementations, the at least one intra-coded video slice includes an intra-coded frame. For example, in some cases, the at least one intra-coded slice is a full forced intra-coded frame, as discussed above. In some implementations, the at least one intra-coded video slice can be included as part of an intra-refresh cycle. For instance, the intra-refresh cycle includes at least one video frame, with each video frame of the at least one video frame including one or more intra-coded video slices. As described above, a number of the at least one video frame of the intra-refresh cycle can be based on various factors, such as the maximum search range noted above, a number of slices in the video frame including the video slice with the missing or corrupted data, a location of the video slice in the video frame, a time when the intra-refresh cycle is inserted into the updated video bitstream based on the feedback information, any combination thereof, and/or other factors. As noted above, the time when the intra-refresh cycle is inserted can be based on the delay between the detection of the missing or corrupted slice and the insertion of the slices of the intra-refresh cycle or I-frame (e.g., based in part on how fast the encoding device can react and insert the intra-refresh cycle or I-frame).

In one illustrative example, when the location of the video slice is a first slice in the video frame, the at least one video frame of the intra-refresh cycle includes at least two frames. For instance, referring to FIG. 6A as an example, the slice 604a can have missing packets, in which case the intra-refresh cycle can be determined to have two frames, with a first intra-refresh frame 606a having a first I-slice 605a and a second intra-refresh frame 608a having a second I-slice 608a. In such an example, the computing device can perform error concealment on a first frame of the at least two frames (e.g., on frame 606a) and not on a second frame (e.g., frame 608a) of the at least two frames. The second frame is subsequent to the first frame in the video bitstream.

In another illustrative example, when the location of the video slice is not a first slice in the video frame, the at least one video frame of the intra-refresh cycle includes an intra-coded frame. For instance, referring to FIG. 6B as an example, the slice 604b can have missing or corrupted packets, in which case a full I-frame 606b can be inserted to cover propagated error. In another example, referring to FIG.

8D, the slice 804*d* can have missing or corrupted packets, and a full I-frame 806*d* can be inserted to cover propagated error.

In another example, when the location of the video slice is a last slice in the video frame, the at least one video frame of the intra-refresh cycle includes at least two frames. For instance, referring to FIG. 6D as an example, the slice 604*d* can have missing packets, and the intra-refresh cycle can be determined to have two frames, with a first intra-refresh frame 606*d* having a first I-slice 605*d* and a second intra-refresh frame 608*d* having a second I-slice 608*d*. In such an example, the computing device can perform error concealment on a first frame of the at least two frames (e.g., on frame 606*d*) and on a second frame (e.g., frame 608*d*) of the at least two frames based on the video slice being a last slice in the video frame. The second frame is subsequent to the first frame in the video bitstream.

FIG. 14 is a flowchart illustrating an example of a process 1400 for processing video data. At block 1402, the process 1400 includes receiving, at an encoding device, feedback information from a computing device (e.g., decoding device 112 of FIG. 1). The feedback information indicates at least a portion of a video slice of a video frame in a video bitstream is missing or corrupted. For example, the feedback information can include information indicating that the video slice has one or more missing packets. In some examples, the information can include an indication of the picture that includes the missing or corrupted slice, and one or more slices that include the missing packets.

At block 1402, the process 1400 includes generating an updated video bitstream in response to the feedback information. The updated video bitstream includes at least one intra-coded video slice having a size that is larger than the missing or corrupted video slice. As noted above with respect to FIG. 13, the updated video bitstream can include a subsequent portion of the video bitstream, and the at least one intra-coded video slice is included in a later frame in the video bitstream than the video frame including the slice with the missing or corrupted information (e.g., packets). For example, the at least one intra-coded slice in the updated video bitstream can have a higher picture order count (POC), output order, and/or decoding order than the POC, output order, and/or decoding order of the video frame including the slice with missing or corrupted information (e.g., packets) in the video bitstream.

The size of the at least one intra-coded video slice is determined to cover (or compensate for) the missing or corrupted slice and propagated error in the video frame caused by the missing or corrupted slice. The propagated error in the video frame can be caused by the missing or corrupted slice based on a motion search range. For example, as noted above, any area of a video frame that can predict from a missing or corrupted slice may have corrupted video data. In some examples, the missing or corrupted slice spans from a first row to a second row in the video frame. The encoding device can determine the size of the at least one intra-coded video slice to include, at least, the first row minus the motion search range to the second row plus the motion search range. In some cases, the at least one intra-coded video slice can be larger than the first row minus the motion search range to the second row plus the motion search range. For example, referring to the example from above with respect to FIG. 8A, using the X−d to Y+d (after one frame), X−2d to Y+2d (after two frames), etc. formulation, a missing or corrupted slice can span from row 1 to row 180 in the original frame 802*a*, and error can propagate to row 212 (180+32=212). An intra-coded video slice (e.g., I-slice 805*a*) can be generated so that the intra-blocks of the intra-coded video slice span from row 1 to row 360 in an intra-refresh frame (e.g., intra-refresh frame 806*a*), which can ensure that the error (from row 1 to row 212) is cleared.

As described above, the computing device can, in response to at least the portion of the video slice being missing or corrupted, perform error concealment on one or more video frames until an error-free intra-coded video slice is received in the updated video bitstream.

In some implementations, the at least one intra-coded video slice includes an intra-coded frame. For example, in some cases, the at least one intra-coded slice is a full forced intra-coded frame. In some implementations, the at least one intra-coded video slice can be included as part of an intra-refresh cycle. For instance, the intra-refresh cycle includes at least one video frame, with each video frame of the at least one video frame including one or more intra-coded video slices. For example, the encoder can determine to insert I-slices over multiple frames of an intra-refresh cycle (e.g., as shown in FIG. 6A, FIG. 6D, FIG. 7A, FIG. 7B, among others). In other examples, the encoder can determine to insert a full I-frame (e.g., as shown in FIG. 6B and FIG. 6C). As described above, whether to insert a full I-frame or to insert multiple video frames of the intra-refresh cycle can be based on various factors, such as the maximum search range noted above, a number of slices in the video frame including the video slice with the missing or corrupted data, a location of the video slice in the video frame, a time when the intra-refresh cycle is inserted into the updated video bitstream based on the feedback information, any combination thereof, and/or other factors.

In some cases, the encoding device can store the updated video bitstream (e.g., in a decoded picture buffer (DPB), in a storage location for retrieval for decoding and display, and/or other storage). In some cases, the encoding device can transmit the updated video bitstream to the computing device.

In some implementations, as described in more detail below, the encoding device can be synchronized to a common reference clock along with other encoding devices. In such implementations, the process 1400 can include add intra-coded video data to the video bitstream according to a reference clock shared with at least one other encoding device. The reference clock defines a schedule for staggering intra-coded video from the encoding device and the at least one other encoding device. The process 1400 can include sending, in response to the feedback information, a request to adapt the reference clock to allow the encoding device to add intra-coded video data to the video bitstream at an unscheduled time slot. The process 1400 can include receiving an indication that the reference clock is updated to define an updated schedule, and adding, based on the updated schedule, the intra-coded video slice to the video bitstream according to the updated reference clock. Further details of encoder synchronization are described below with respect to FIG. 10-FIG. 12 and FIG. 15.

Figure 16:
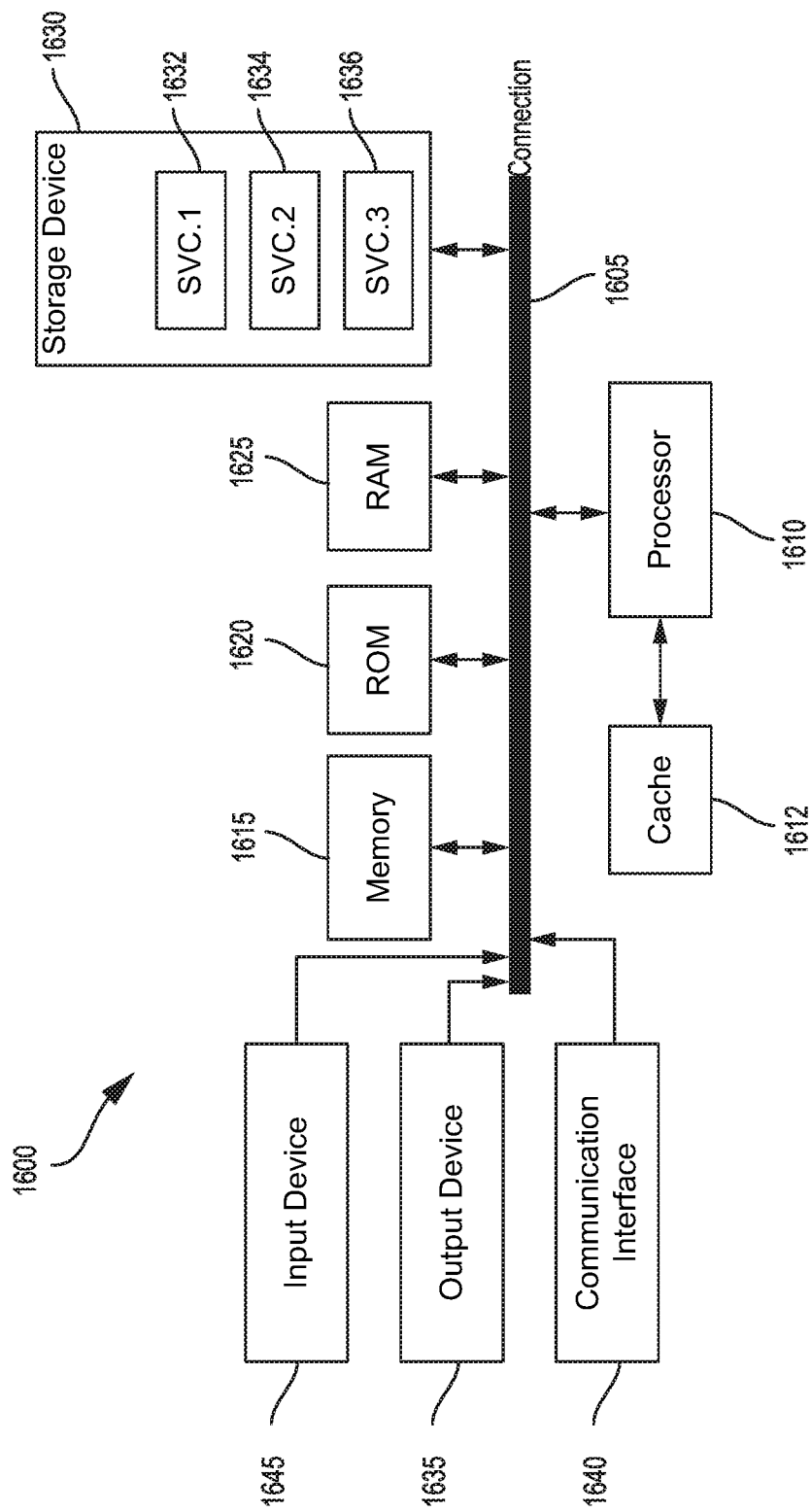
FIG. 16 is an example computing device architecture of an example computing device that can implement the various techniques described herein.

In some examples, the processes 1300 and/or 1400 may be performed by a computing device or apparatus, such as a computing device having the computing device architecture 1600 shown in FIG. 16. In some examples, the process 1300 can be performed by a computing device with the computing device architecture 1600 implementing a decoding device (e.g., decoding device 112) or a client device including a decoding device or in communication with a decoding device. In some examples, the process 1400 can be performed by a computing device with the computing device architecture 1600 implementing an encoding device (e.g., encoding device 104) or a server including an encoding device or in communication with an encoding device. In one illustrative example, the computing device (e.g., performing the process 1300) can include an extended reality display device, and the encoding device (e.g., performing the process 1400) can be part of a server. In such an example, the encoding device is configured to generate the video bitstream for processing (e.g., decoding) and display by the extended reality display device based on motion information (e.g., pose, orientation, movement, etc.) provided by the extended reality display device and received by the encoding device (and/or the server). For example, the extended reality display device (or a device, such as a mobile device or other device, connected to the extended reality display device) can send or transmit the motion information (e.g., pose information, orientation, eye position, and/or other information) to the server. The server or part of the server (e.g., the media source engine 204 from FIG. 2) can generate extended reality content based on the motion information, and the encoding device can generate a video bitstream including coded frames (or pictures) with the extended reality content.

In some cases, the computing device or apparatus may include an input device, an output device, one or more processors, one or more microprocessors, one or more microcomputers, and/or other component(s) that is/are configured to carry out the steps of processes 1300 and/or 1400. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The processes 1300 and/or 1400 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1300 and/or 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted previously, systems and techniques are also described herein for synchronizing an encoding device to a common reference clock along with other encoding devices. FIG. 10 is a diagram illustrating a system that includes multiple encoding devices (including encoding device 1030*a*, encoding device 1030*b*, through encoding device 1030*n*, where n can be any integer value) in communication with a network device 1032 over a wireless network 1031. The network entity 1032 can include a wireless access point (AP), a server (e.g., a server containing an encoding device, such as the server side 202 of FIG. 2), a base station, a router, a network bridge, a network gateway, or another network device or system. The wireless network 1031 can include a broadband network (e.g., 5G, 4G or LTE, 3G, or other broadband network), a WiFi network, or other wireless network.

The network device 1032 is in communication with one or more client devices (e.g., a personal computer 1034*a*, an XR headset 1034*b*, and a mobile smartphone 1034*c*) over a wireless network 1033. The wireless network 1033 can include a broadband network (e.g., 5G, 4G or LTE, 3G, or other broadband network), a WiFi network, or other wireless network. In one illustrative example, the wireless network 1031 includes a broadband network, and the wireless network 1033 includes a WiFi network. In another illustrative example, the wireless network 1031 and the wireless network 1033 include a broadband network (e.g., the same broadband network or different broadband networks).

The encoding devices 1030*a*, 1030*b*, through 1030*n* are synchronized to a common reference clock. The common reference clock is set by the network device 1032. For example, the network device 1032 can provide each encoding device 1030*a*, 1030*b*, through 1030*n* with a time reference (e.g., a frame insertion schedule) to transmit encoded data, where each time reference is unique to one encoding device. The encoded data can represent a full frame, an eye buffer, or a slice (or group of slices). While three encoding devices are shown in FIG. 10, one of ordinary skill will appreciate that any number (less than three or more than three) encoding devices can be synchronized to the common reference clock.

In some cases, the encoding devices 1030*a*, 1030*b*, through 1030*n* can be synchronized to the common clock with periodic (non-dynamic) I-frames/I-slices, so that I-frames/I-slices from different users can be staggered to minimize the number of total I-frames/I-slices at any given time. For instance, the network device 1032 can assign each encoding device 1030*a*, 1030*b*, through 1030*n* an index as each encoding device 1030*a*, 1030*b*, through 1030*n* connects to the network device 1032. The network device 1032 can provide a global reference clock for the different encoding devices 1030*a*, 1030*b*, through 1030*n* to send I-frames/I-slices at separate time intervals based on their assigned index. Such a technique can be beneficial in various use cases, such as in strict CBR encoding structures, cyclic intra-refresh encoding structures, among others.

Figure 11:
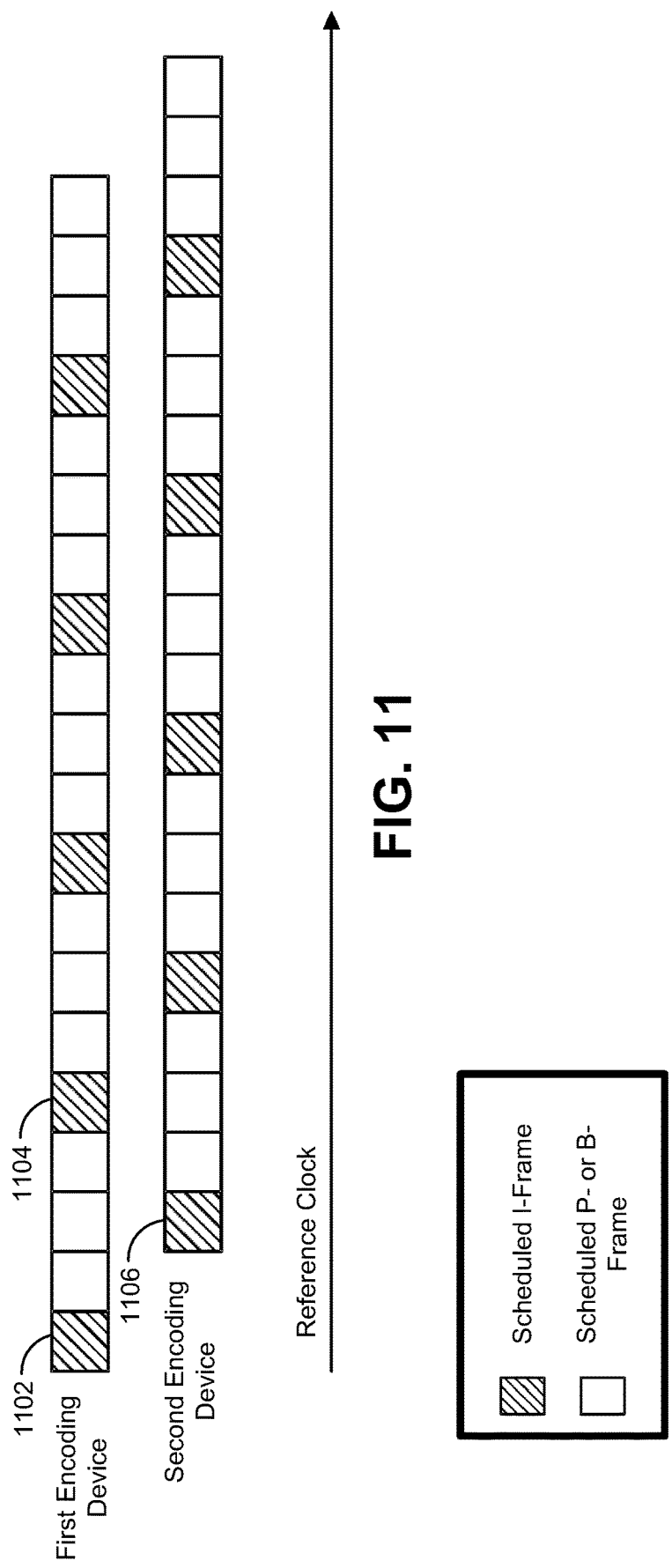
FIG. 11 is a diagram illustrating an example of video coding structures, with periodic I-frames, of two encoding devices that are synchronized with a reference clock, in accordance with some examples.

FIG. 11 is a diagram illustrating an example of video coding structures of two encoding devices (e.g., two of the encoding devices 1030*a*, 1030*b*, through 1030*n* from FIG. 10) that are synchronized with a reference clock. The coding structures shown in FIG. 11 are shown with periodic I-frames insertion. A first encoding device and a second encoding device can each be assigned a unique index by a network device (e.g., the network device 1032) as each encoding device connects (e.g., at initial connection) to the network device. The network device can provide a global common reference clock for all encoding devices, which defines a frame insertion schedule indicating when the first encoding device and the second encoding device (and any other encoding devices connected to the device) will send I-frames, I-slices, and/or other intra-coded video data at separated time intervals based on their assigned index. Each encoding device can then send I-frames and/or I-slices (or other intra-coded data) based on their assigned index and the reference clock, resulting in staggered I-frames/slices from different encoding devices.

As shown, the first encoding device (corresponding to a first user) inserts an I-frame every four frames (including I-frame 1102 and I-frame 1104) according to the common reference clock set to the frame insertion schedule. According to the reference clock, a second encoding device (corresponding to a second user) is scheduled to periodically insert an I-frame every four frames, but starting with a different frame in the time domain. For example, the second encoding device inserts a first I-frame 1106 at a different time than the first I-frame 1102 inserted by the first encoding device based on the different indexes assigned to the first and second encoding devices.

In some cases, the encoding devices (e.g., encoding devices 1030*a*, 1030*b*, through 1030*n*) can be synchronized to a common reference clock and can dynamically insert I-frames and/or I-slices. For instance, when one encoding device receives feedback indicative of one or more lost or corrupted packets, and needs to force an I-frame or I-slice, any non-urgent (e.g., non-feedback based) I-frame and/or I-slice insertion from other encoding devices can be delayed so that the one encoding device can insert an I-frame or I-slice as soon as possible. In one illustrative example, based on feedback information, an impacted encoding device can request the network device (e.g., network device 1032) to adapt the common reference clock to allow that encoding device to immediately insert an I-frame or I-slice (with or without an intra-refresh cycle), such as at a next frame of the bitstream. Based on the updated reference clock from the network device, other encoding devices can adapt their schedules for non-urgent I-frames/I-slices accordingly, so that there is no overlap in I-frames/I-slices. Such a technique can be beneficial in various use cases, such as in strict CBR encoding structures, cyclic intra-refresh encoding structures, when dynamic individual I-slices are inserted, among others.

FIG. 12 is a diagram illustrating another example of video coding structures of two encoding devices (e.g., two of the encoding devices 1030*a*, 1030*b*, through 1030*n* from FIG. 10) that are synchronized with a common reference clock. The coding structures shown in FIG. 12 are shown with periodic insertion and dynamic insertion of I-frames and/or I-one or more slices. A reference clock is set by a network device (e.g., the network device 1032 from FIG. 10) to an initial (or original) frame insertion schedule, which schedules when each encoding device is to insert an I-frame and/or one or more I-slice (with or without an intra-refresh cycle). As shown, a first encoding device (corresponding to a first user) inserts I-frames every four frames, including I-frame 1202 and I-frame 1204, based on an index assigned to the first encoding device. Similar to the example from FIG. 11, a second encoding device (corresponding to a second user) is scheduled to periodically insert an I-frame every four frames, but starting with a different frame in the time domain based on an index assigned to the second encoding device. For example, the second encoding device inserts a first I-frame 1206 at a different time than the first I-frame 1202 inserted by the first encoding device (two frames after the first encoding device inserts a periodically scheduled I-frame).

At frame 1208, a client device (e.g., XR headset 1034*b* in FIG. 10) receiving the bitstream generated by the first encoding device can detect that there are missing or corrupted packets from the frame 1208 or that the frame 1208 is missing. The client device (or the network device in some cases) can send feedback information to the first encoding device. Upon receiving the feedback information, the impacted encoding device can request the network device to adapt the reference clock to allow the encoding device to immediately insert an I-frame, I-slice, or intra-refresh period in a next available frame (which can be at an unscheduled time slot that was not scheduled in the initial frame insertion schedule). The network device can then update the reference clock to an updated schedule based on the request, and all remaining encoding devices can stop inserting I-frames according to their initially-assigned insertion schedule, and can adapt their I-frame/I-slices schedules according to the updated reference clock from the network device.

For example, according to the updated reference clock set to the updated schedule, the first encoding device can insert a forced I-frame 1210 into the bitstream, and then continue to periodically insert I-frames at every four frames thereafter (starting with I-frame 1212). As noted above, once the network device updates the reference clock to the updated schedule based on the request, all remaining encoding devices can adapt their I-frame/I-slices schedules according to the updated reference clock. As shown in FIG. 12, instead of inserting a periodically scheduled I-frame four frames after the periodically scheduled I-frame 1214 (as defined by the initial frame insertion schedule), the second encoding device inserts a P-frame 1216 due to the dynamic insertion of the I-frame 1210 by the first encoding device at that timeslot. Based on the updated reference clock and frame insertion schedule, the second encoding device continues to insert periodically scheduled I-frames every four frames (starting with I-frame 1218 two frames after the first encoding device inserts the dynamically inserted I-frame 1210).

Synchronizing multiple encoding devices to a common reference clock can help in multi-user environments. Synchronization to a common reference clock can also help to reduce bitrate fluctuations over the wireless link regardless of the encoding configuration. For example, bitrate fluctuations over the wireless link can be reduced because multiple I-frames or I-slices will not be transmitted during the same time slots (based on the synchronization).

FIG. 15 is a flowchart illustrating an example of a process 1500 for processing video data. At block 1502, the process 1500 includes generating, by an encoding device (e.g., encoding device 104 of FIG. 1, encoding device 1030*a* of FIG. 10, or other encoding device), a video bitstream. Intra-coded video data is inserted into the video bitstream (e.g., by the encoding device) according to a reference clock shared with at least one other encoding device. The reference clock defines a schedule for staggering intra-coded video from the encoding device and the at least one other encoding device. In some cases, a plurality of encoding devices are synchronized to the reference clock. In such cases, each encoding device of the plurality of encoding devices can be assigned a different time reference, such an an index, by which to transmit encoded data (e.g., a first encoding device is assigned a first time reference, a second encoding device is assigned a second time reference, a third encoding device is assigned a third time reference, and so on). A first time reference assigned to the encoding device is different than a second time reference assigned to the at least one other encoding device. In some examples, the reference clock can be set by a network device (e.g., network device 1032 from FIG. 10), which can include a wireless access point (AP), a server that includes the encoding device or another encoding device, a separate server that does not include one of the encoding devices that adhere to the reference clock, or by another device or system. The device can provide each encoding device with a time reference to transmit encoded data, where each time reference is unique to one encoding device. The encoded data can represent a full frame, an eye buffer, or a slice (or group of slices).

At block 1504, the process 1500 includes obtaining, by the encoding device, feedback information indicating at least a portion of a video slice or at least a portion of a video frame or picture of the video bitstream is missing or corrupted. For example, the feedback information can include information indicating that the video slice has one or more missing packets. In some examples, the information can include an indication of the frame or picture that includes the missing or corrupted slice, and one or more slices that include the missing packets.

At block 1506, the process 1500 includes sending, in response to the feedback information, a request to adapt the reference clock to allow the encoding device to insert intra-coded video data into the video bitstream at an unscheduled time slot. The request can be sent to the network device that sets the reference clock (e.g., AP, server, or the like). At block 1508, the process 1500 includes receiving an indication (e.g., from the device that sets the reference clock) that the reference clock is updated to define an updated schedule.

At block 1510, the process 1500 includes inserting, based on the updated schedule, the intra-coded video data into the video bitstream according to the updated reference clock. The unscheduled time slot requested by the encoding device deviates from a plurality of time slots defined by the reference clock for the encoding device. For example, as shown in FIG. 12, the first encoding device dynamically inserts the I-frame 1210 at a timeslot that is different than the timeslot originally scheduled for the first encoding device by the original schedule of the reference clock. Once the clock is reset based on the request from the first encoding device, the first encoding device will continue to periodically insert I-frames every fourth frame until it encounters a missing or corrupted frame or the clock is again reset based on a request from another encoding device.

The updated reference clock can be shared with the at least one other encoding device (e.g., one or more of the encoding devices 1030*b* through 1030*n*). In some examples, based on the updated schedule, the at least one other encoding device delays scheduling intra-coded video relative to a previously scheduled time slot defined by the reference clock. For example, again referring to FIG. 12, instead of inserting a periodically scheduled I-frame four frames after the periodically scheduled I-frame 1214 (as defined by the initial frame insertion schedule), the second encoding device inserts a P-frame 1216 based on the updated reference clock due to the dynamic insertion of the I-frame 1210 by the first encoding device at that timeslot.

In some examples, the intra-coded video data includes one or more intra-coded video frames. For instance, the intra-coded video data can include one or more intra-coded video slices. In another example, the intra-coded video data can include an intra-refresh period, which includes at least one video frame. For instance, each video frame of the at least one video frame can include one or more intra-coded video slices. In another example, the intra-coded video data can include a full I-frame.

In some implementations, the feedback information is provided from a computing device. In some implementations, the computing device can include an extended reality display device, and the encoding device that performs the process 1500 can be part of a server. The encoding device is configured to generate the video bitstream for processing (e.g., decoding) and display by the extended reality display device based on motion information (e.g., pose, orientation, movement, etc.) provided by the extended reality display device and received by the encoding device (and/or the server). For example, the extended reality display device (or a device, such as a mobile device or other device, connected to the extended reality display device) can send or transmit the motion information (e.g., pose information, orientation, eye position, and/or other information) to the server. The server or part of the server (e.g., the media source engine 204 from FIG. 2) can generate extended reality content based on the motion information, and the encoding device can generate a video bitstream including coded frames (or pictures) with the extended reality content.

In some examples, the process 1500 may be performed by a computing device or apparatus, such as a computing device having the computing device architecture 1600 shown in FIG. 16. In some examples, the process 1500 can be performed by a computing device with the computing device architecture 1600 implementing an encoding device (e.g., encoding device 104) or a server including an encoding device or in communication with an encoding device. In some cases, the computing device or apparatus may include an input device, an output device, one or more processors, one or more microprocessors, one or more microcomputers, and/or other component(s) that is/are configured to carry out the steps of process 1500. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 16 illustrates an example computing device architecture 1600 of an example computing device which can implement the various techniques described herein. The components of computing device architecture 1600 are shown in electrical communication with each other using connection 1605, such as a bus. The example computing device architecture 1600 includes a processing unit (CPU or processor) 1610 and computing device connection 1605 that couples various computing device components including computing device memory 1615, such as read only memory (ROM) 1620 and random access memory (RAM) 1625, to processor 1610.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1600, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communications interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, comprising:
determining, by a computing device, at least a portion of a video slice of a video frame in a video bitstream is missing data or includes corrupted data, the video slice associated with the missing data or the corrupted data spanning from a first row to a second row in the video frame;
sending feedback information to an encoding device, the feedback information indicating at least the portion of the video slice is missing the data or includes the corrupted data; and
receiving an updated video bitstream from the encoding device in response to the feedback information, the updated video bitstream including at least one intra-coded video slice having a size that is larger than the video slice associated with the missing data or the corrupted data, wherein the size of the at least one intra-coded video slice included in the received updated video bitstream is defined to include the first row in the video frame minus a multiple of a motion search range to the second row in the video frame plus the multiple of the motion search range.

2. The method of claim 1, wherein propagated error in the video frame caused by the video slice associated with the missing data or the corrupted data is based on the motion search range.

3. The method of claim 1, further comprising:
performing, in response to determining at least the portion of the video slice is missing or corrupted, error concealment on one or more video frames until an error-free intra-coded video slice is received in the updated video bitstream.

4. The method of claim 1, wherein the at least one intra-coded video slice includes an intra-coded frame.

5. The method of claim 1, wherein the at least one intra-coded video slice is included as part of an intra-refresh cycle, the intra-refresh cycle including at least one video frame, each video frame of the at least one video frame including one or more intra-coded video slices.

6. The method of claim 5, wherein a number of the at least one video frame of the intra-refresh cycle is based on at least one of a number of slices in the video frame including the video slice, a location of the video slice in the video frame, and when the intra-refresh cycle is inserted into the updated video bitstream based on the feedback information.

7. The method of claim 6, wherein, when the location of the video slice is a first slice in the video frame, the at least one video frame of the intra-refresh cycle includes at least two frames.

8. The method of claim 7, further comprising:
performing error concealment on a first frame of the at least two frames and not on a second frame of the at least two frames, the second frame being subsequent to the first frame in the video bitstream.

9. The method of claim 6, wherein, when the location of the video slice is not a first slice in the video frame, the at least one video frame of the intra-refresh cycle includes an intra-coded frame.

10. The method of claim 6, wherein, when the location of the video slice is a last slice in the video frame, the at least one video frame of the intra-refresh cycle includes at least two frames.

11. The method of claim 10, further comprising:
performing error concealment on a first frame and a second frame of the at least two frames based on the video slice being a last slice in the video frame.

12. The method of claim 1, wherein the computing device includes an extended reality display device configured to provide motion information to the encoding device for generating the video bitstream for display by the extended reality display device.

13. The method of claim 1, wherein the multiple of the motion search range includes a value of one.

14. The method of claim 1, wherein the multiple of the motion search range includes a value of two.

15. An apparatus for processing video data, the apparatus comprising:
a memory configured to store video data; and
a processor implemented in circuitry and configured to:
determine at least a portion of a video slice of a video frame in a video bitstream is missing data or includes corrupted data, the video slice associated with the missing data or the corrupted data spanning from a first row to a second row in the video frame;
send feedback information to an encoding device, the feedback information indicating at least the portion of the video slice is missing the data or includes the corrupted data; and receive an updated video bitstream from the encoding device in response to the feedback information, the updated video bitstream including at least one intra-coded video slice having a size that is larger than the video slice associated with the missing data or the corrupted data, wherein the size of the at least one intra-coded video slice included in the received updated video bitstream is defined to include the first row in the video frame minus a multiple of a motion search range to the second row in the video frame plus the multiple of the motion search range.

16. The apparatus of claim 15, wherein propagated error in the video frame caused by the video slice associated with the missing data or the corrupted data is based on the motion search range.

17. The apparatus of claim 15, wherein the processor is further configured to:
perform, in response to determining at least the portion of the video slice is missing or corrupted, error concealment on one or more video frames until an error-free intra-coded video slice is received in the updated video bitstream.

18. The apparatus of claim 15, wherein the at least one intra-coded video slice is included as part of an intra-refresh cycle, the intra-refresh cycle including at least one video frame, each video frame of the at least one video frame including one or more intra-coded video slices.

19. The apparatus of claim 18, wherein a number of the at least one video frame of the intra-refresh cycle is based on at least one of a number of slices in the video frame including the video slice, a location of the video slice in the video frame, and when the intra-refresh cycle is inserted into the updated video bitstream based on the feedback information.

20. The apparatus of claim 19, wherein, when the location of the video slice is a first slice in the video frame, the at least one video frame of the intra-refresh cycle includes at least two frames.

21. The apparatus of claim 20, wherein the processor is further configured to:
perform error concealment on a first frame of the at least two frames and not on a second frame of the at least two frames, the second frame being subsequent to the first frame in the video bitstream.

22. The apparatus of claim 19, wherein, when the location of the video slice is not a first slice in the video frame, the at least one video frame of the intra-refresh cycle includes an intra-coded frame.

23. The apparatus of claim 19, wherein, when the location of the video slice is a last slice in the video frame, the at least one video frame of the intra-refresh cycle includes at least two frames.

24. The apparatus of claim 23, wherein the processor is further configured to:
perform error concealment on a first frame and a second frame of the at least two frames based on the video slice being a last slice in the video frame.

25. The apparatus of claim 15, wherein the apparatus includes an extended reality display device configured to provide motion information to the encoding device for generating the video bitstream for display by the extended reality display device.

26. The apparatus of claim 15, wherein the multiple of the motion search range includes a value of one.

27. The apparatus of claim 15, wherein the multiple of the motion search range includes a value of two.

28. A non-transitory computer-readable medium having stored thereon instructions that, when executed by one or more processors, cause the one or more processors to:
determine at least a portion of a video slice of a video frame in a video bitstream is missing data or includes corrupted data, the video slice associated with the missing data or the corrupted data spanning from a first row to a second row in the video frame;
send feedback information to an encoding device, the feedback information indicating at least the portion of the video slice is missing the data or includes the corrupted data; and
receive an updated video bitstream from the encoding device in response to the feedback information, the updated video bitstream including at least one intra-coded video slice having a size that is larger than the video slice associated with the missing data or the corrupted data, wherein the size of the at least one intra-coded video slice included in the received updated video bitstream is defined to include the first row in the video frame minus a multiple of a motion search range to the second row in the video frame plus the multiple of the motion search range.

29. The non-transitory computer-readable medium of claim 28, wherein the at least one intra-coded video slice is included as part of an intra-refresh cycle, the intra-refresh cycle including at least one video frame, each video frame of the at least one video frame including one or more intra-coded video slices.

30. A method of processing video data, comprising:
receiving, at an encoding device, feedback information from a computing device, the feedback information indicating at least a portion of a video slice of a video frame in a video bitstream is missing data or includes corrupted data, the video slice associated with the missing data or the corrupted data spanning from a first row to a second row in the video frame; and
generating an updated video bitstream in response to the feedback information, the updated video bitstream including at least one intra-coded video slice having a size that is larger than the video slice associated with the missing data or the corrupted data, wherein the size of the at least one intra-coded video slice is determined to include the first row minus a multiple of a motion search range to the second row plus the multiple of the motion search range.

31. The method of claim 30, wherein propagated error in the video frame caused by the video slice associated with the missing data or the corrupted data is based on the motion search range.

32. The method of claim 30, wherein, in response to at least the portion of the video slice being missing or corrupted, error concealment is performed on one or more video frames until an error-free intra-coded video slice is received in the updated video bitstream.

33. The method of claim 30, wherein the at least one intra-coded video slice is included as part of an intra-refresh cycle, the intra-refresh cycle including at least one video frame, each video frame of the at least one video frame including one or more intra-coded video slices.

34. The method of claim 33, further comprising:
determining a number of the at least one video frame of the intra-refresh cycle based on at least one of a number of slices in the video frame including the video slice, a location of the video slice in the video frame, and when the intra-refresh cycle is inserted into the updated video bitstream based on the feedback information.

35. The method of claim 34, wherein, when the location of the video slice is a first slice in the video frame, the at least one video frame of the intra-refresh cycle is determined to include at least two frames.

36. The method of claim 35, wherein error concealment is performed on a first frame of the at least two frames and not on a second frame of the at least two frames, the second frame being subsequent to the first frame in the video bitstream.

37. The method of claim 34, wherein, when the location of the video slice is not a first slice in the video frame, the at least one video frame of the intra-refresh cycle is determined to include an intra-coded frame.

38. The method of claim 34, wherein, when the location of the video slice is a last slice in the video frame, the at least one video frame of the intra-refresh cycle is determined to include at least two frames.

39. The method of claim 38, wherein error concealment is performed on a first frame and a second frame of the at least two frames based on the video slice being a last slice in the video frame.

40. The method of claim 30, wherein the computing device includes an extended reality display device, and wherein the encoding device is part of a server, the encoding device being configured to generate the video bitstream for display by the extended reality display device based on motion information received by the encoding device from the extended reality display device.

41. The method of claim 30, further comprising:
adding intra-coded video data to the video bitstream according to a reference clock shared with at least one other encoding device, the reference clock defining a schedule for staggering intra-coded video from the encoding device and the at least one other encoding device;
sending, in response to the feedback information, a request to adapt the reference clock to allow the encoding device to add intra-coded video data to the video bitstream at an unscheduled time slot;
receiving an indication that the reference clock is updated to define an updated schedule; and
adding, based on the updated schedule, the at least one intra-coded video slice to the video bitstream according to the updated reference clock.

42. The method of claim 30, further comprising:
transmitting the updated video bitstream to the computing device.

43. The method of claim 30, further comprising:
storing the updated video bitstream.

44. The method of claim 30, wherein the multiple of the motion search range includes a value of one.

45. An apparatus for processing video data, the apparatus comprising:
a memory configured to store video data; and
a processor implemented in circuitry and configured to:
receive feedback information from a computing device, the feedback information indicating at least a portion of a video slice of a video frame in a video bitstream is missing data or includes corrupted data, the video slice associated with the missing data or the corrupted data spanning from a first row to a second row in the video frame; and
generate an updated video bitstream in response to the feedback information, the updated video bitstream including at least one intra-coded video slice having a size that is larger than the video slice associated with the missing data or the corrupted data, wherein the size of the at least one intra-coded video slice is determined to include the first row minus a multiple of a motion search range to the second row plus the multiple of the motion search range.

46. The apparatus of claim 45, wherein propagated error in the video frame caused by the video slice associated with the missing data or the corrupted data is based on the motion search range.

47. The apparatus of claim 45, wherein, in response to determining at least the portion of the video slice is missing or corrupted, error concealment is performed on one or more video frames until an error-free intra-coded video slice is received in the updated video bitstream.

48. The apparatus of claim 45, wherein the at least one intra-coded video slice is included as part of an intra-refresh cycle, the intra-refresh cycle including at least one video frame, each video frame of the at least one video frame including one or more intra-coded video slices.

49. The apparatus of claim 48, wherein the processor is configured to:
determine a number of the at least one video frame of the intra-refresh cycle based on at least one of a number of slices in the video frame including the video slice, a location of the video slice in the video frame, and when the intra-refresh cycle is inserted into the updated video bitstream based on the feedback information.

50. The apparatus of claim 49, wherein, when the location of the video slice is a first slice in the video frame, the at least one video frame of the intra-refresh cycle is determined to include at least two frames.

51. The apparatus of claim 50, wherein error concealment is performed on a first frame of the at least two frames and not on a second frame of the at least two frames, the second frame being subsequent to the first frame in the video bitstream.

52. The apparatus of claim 49, wherein, when the location of the video slice is not a first slice in the video frame, the at least one video frame of the intra-refresh cycle is determined to include an intra-coded frame.

53. The apparatus of claim 49, wherein, when the location of the video slice is a last slice in the video frame, the at least one video frame of the intra-refresh cycle is determined to include at least two frames.

54. The apparatus of claim 53, wherein error concealment is performed on a first frame and a second frame of the at least two frames based on the video slice being a last slice in the video frame.

55. The apparatus of claim 45, wherein the computing device includes an extended reality display device, and wherein the apparatus includes an encoding device as part of a server, the encoding device being configured to generate the video bitstream for display by the extended reality display device based on motion information received by the encoding device from the extended reality display device.

56. The apparatus of claim 45, further comprising:
a transmitter configured to transmit the updated video bitstream to the computing device.

57. The apparatus of claim 45, wherein the memory is configured to store the updated video bitstream.

58. The apparatus of claim 45, wherein the multiple of the motion search range includes a value of one.

59. A non-transitory computer-readable medium having stored thereon instructions that, when executed by one or more processors, cause the one or more processors to:
receive feedback information from a computing device, the feedback information indicating at least a portion of a video slice of a video frame in a video bitstream is missing data or includes corrupted data, the video slice associated with the missing data or the corrupted data spanning from a first row to a second row in the video frame; and generate an updated video bitstream in response to the feedback information, the updated video bitstream including at least one intra-coded video slice having a size that is larger than the video slice associated with the missing data or the corrupted data, wherein the size of the at least one intra-coded video slice is determined to include the first row minus a multiple of a motion search range to the second row plus the multiple of the motion search range.

60. The non-transitory computer-readable medium of claim 59, wherein the at least one intra-coded video slice is included as part of an intra-refresh cycle, the intra-refresh cycle including at least one video frame, each video frame of the at least one video frame including one or more intra-coded video slices.

* * * * *